(12) United States Patent
Tonouchi

(10) Patent No.: US 7,127,511 B2
(45) Date of Patent: Oct. 24, 2006

(54) SYSTEM FOR AND A METHOD OF PROVIDING AN ONLINE TIME PERIOD RESERVING SERVICE, WHICH CAN PROTECT AN EXCESSIVE LOAD FROM BEING APPLIED TO A COMMUNICATION SYSTEM, IN ORDER TO PROVIDE A STABLE COMMUNICATION TO A USER

(75) Inventor: Toshio Tonouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 696 days.

(21) Appl. No.: 09/881,129

(22) Filed: Jun. 14, 2001

(65) Prior Publication Data

US 2002/0004833 A1  Jan. 10, 2002

(30) Foreign Application Priority Data

Jun. 15, 2000  (JP)  ............................. 2000-179216

(51) Int. Cl.
*G06F 15/173* (2006.01)
(52) U.S. Cl. ...................................................... 709/225
(58) Field of Classification Search ................ 709/226, 709/229, 217–219, 225; 370/352; 705/5
See application file for complete search history.

(56) References Cited

U.S. PATENT DOCUMENTS

| | | | | |
|---|---|---|---|---|
| 5,828,845 A | * | 10/1998 | Jagadish et al. | ............. 709/225 |
| 5,832,451 A | * | 11/1998 | Flake et al. | ..................... 705/5 |
| 5,832,457 A | * | 11/1998 | O'Brien et al. | ................ 705/14 |
| 5,877,704 A | * | 3/1999 | Yoshida | ..................... 340/932.2 |
| 5,933,490 A | * | 8/1999 | White et al. | ............ 379/221.01 |
| 5,948,040 A | * | 9/1999 | DeLorme et al. | ............ 701/201 |
| 5,958,016 A | * | 9/1999 | Chang et al. | ................ 709/225 |
| 6,084,875 A | * | 7/2000 | Forrest | ....................... 370/355 |
| 6,105,027 A | * | 8/2000 | Schneider et al. | ........... 709/225 |
| 6,115,460 A | * | 9/2000 | Crowe et al. | ........... 379/211.02 |
| 6,145,002 A | * | 11/2000 | Srinivasan | .................... 709/225 |
| 6,151,628 A | * | 11/2000 | Xu et al. | ...................... 709/225 |
| 6,233,618 B1 | * | 5/2001 | Shannon | ...................... 709/225 |
| 6,246,755 B1 | * | 6/2001 | Walker et al. | ............ 379/114.2 |
| 6,292,904 B1 | * | 9/2001 | Broomhall et al. | .......... 709/225 |
| 6,324,176 B1 | * | 11/2001 | Bodnar et al. | .............. 370/376 |
| 6,335,968 B1 | * | 1/2002 | Malik | ....................... 379/114.2 |
| 6,360,254 B1 | * | 3/2002 | Linden et al. | .............. 709/219 |

(Continued)

FOREIGN PATENT DOCUMENTS

JP  10027036 A  *  1/1998

(Continued)

OTHER PUBLICATIONS

"The Computer Language Company Inc." copy right 1981-2005 (dictionary).*

(Continued)

*Primary Examiner*—Jason Cardone
*Assistant Examiner*—Ajay Bhatia
(74) *Attorney, Agent, or Firm*—Scully, Scott, Murphy & Presser, P.C.

(57) ABSTRACT

A system of reserving a connecting service to the internet at a time period, includes a reservation table and a contract unit. A state with regard to a reservation for a connecting service to the internet at a time period is stored in the reservation table. The contract unit inputs a reserving demand to reserve the connecting service to the internet at a certain time period from a user to judge whether the reserving demand is permitted with reference to the reservation table.

17 Claims, 28 Drawing Sheets

U.S. PATENT DOCUMENTS

| | | | |
|---|---|---|---|
| 6,393,484 B1* | 5/2002 | Massarani | 709/225 |
| 6,415,027 B1* | 7/2002 | Malik | 379/221.01 |
| 6,459,783 B1* | 10/2002 | March et al. | 379/211.02 |
| 6,507,870 B1* | 1/2003 | Yokell et al. | 709/225 |
| 6,519,333 B1* | 2/2003 | Malik | 379/207.02 |
| 6,538,416 B1* | 3/2003 | Hahne et al. | 370/431 |
| 6,584,097 B1* | 6/2003 | Malik | 370/352 |
| 6,618,370 B1* | 9/2003 | Malik | 370/352 |
| 6,690,929 B1* | 2/2004 | Yeh | 455/406 |
| 6,732,178 B1* | 5/2004 | Van Horne et al. | 709/219 |
| 6,748,067 B1* | 6/2004 | Malik | 379/114.2 |
| 6,842,783 B1* | 1/2005 | Boivie et al. | 709/225 |
| 2002/0041663 A1* | 4/2002 | Malik | 379/114.02 |
| 2002/0042738 A1* | 4/2002 | Srinivasan et al. | 705/14 |
| 2003/0084151 A1* | 5/2003 | Simpson et al. | 709/225 |
| 2003/0212599 A1* | 11/2003 | Kepecs | 705/14 |
| 2003/0216172 A1* | 11/2003 | LeMay et al. | 463/29 |

FOREIGN PATENT DOCUMENTS

| | | |
|---|---|---|
| JP | 2002015191 A * | 1/2002 |
| WO | WO 200063808 A1 * | 10/2000 |

OTHER PUBLICATIONS

Guaranteed Internet bandwidth, Arango et al., Global Telecommunications Conference, 1996, Publication Nov. 18-22, pp. 862-866.*

* cited by examiner

Fig. 16

RESERVATION CONFIRMATION PAGE

TIME PERIOD RESERVATION SERVICE

THE FOLLOWING REQUEST OF Mr. TANAKA IS ACCEPTABLE

START TIME 10:00 MARCH 26th
END TIME 17:00 MARCH 26th

ACCOUNTING FEE 420 YEN
RESERVATION?

RESERVATION DETERMINATION    CANCEL

Fig. 17

RESERVATION DETERMINATION PAGE

TIME PERIOD RESERVATION SERVICE

THE FOLLOWING REQUEST OF Mr. TANAKA IS ACCEPTED

START TIME 10:00 MARCH 26th
END TIME 17:00 MARCH 26th

ACCOUNTING FEE 420 YEN

☑ TO MENU
☐ TO LOGOUT

OK    CANCEL

Fig.18

RESERVATION LIST PAGE

TIME PERIOD RESERVATION SERVICE

LIST OF TIME PERIOD RESERVATION STATE OF Mr.TANAKA

START TIME 10:00 MARCH 26th
END TIME 17:00 MARCH 26th

PENALTY FEE 150 YEN
○     CANCEL

START TIME 10:00 MARCH 30th
END TIME 17:00 MARCH 30th

PENALTY FEE 10 YEN
●     CANCEL

FEE    1200 YEN   (FEE CONFIRMATION)

(CONFIRMATION) (CLEAR) (TO MENU)

Fig.19

CANCEL CONFIRMATION PAGE

TIME PERIOD RESERVATION SERVICE

DO YOU CANCEL THE FOLLOWING RESERVATION ?

START TIME 10:00 MARCH 30th
END TIME 17:00 MARCH 30th

PENALTY FEE 10 YEN (CONFIRMATION) (CANCEL)

BILL PAGE

TIME PERIOD RESERVATION SERVICE

USAGE STATE OF Mr.TANAKA
MARCH 1st/2000~ MARCH 24st/2000

START TIME 10:00 MARCH 10th
END TIME 17:00 MARCH 10th

START TIME 10:00 MARCH 11th
END TIME 17:00 MARCH 11th

BILLED FEE 1400 YEN
PLEASE DO THE PAYMENT BY APRIL 1st 2000

( TO MENU )

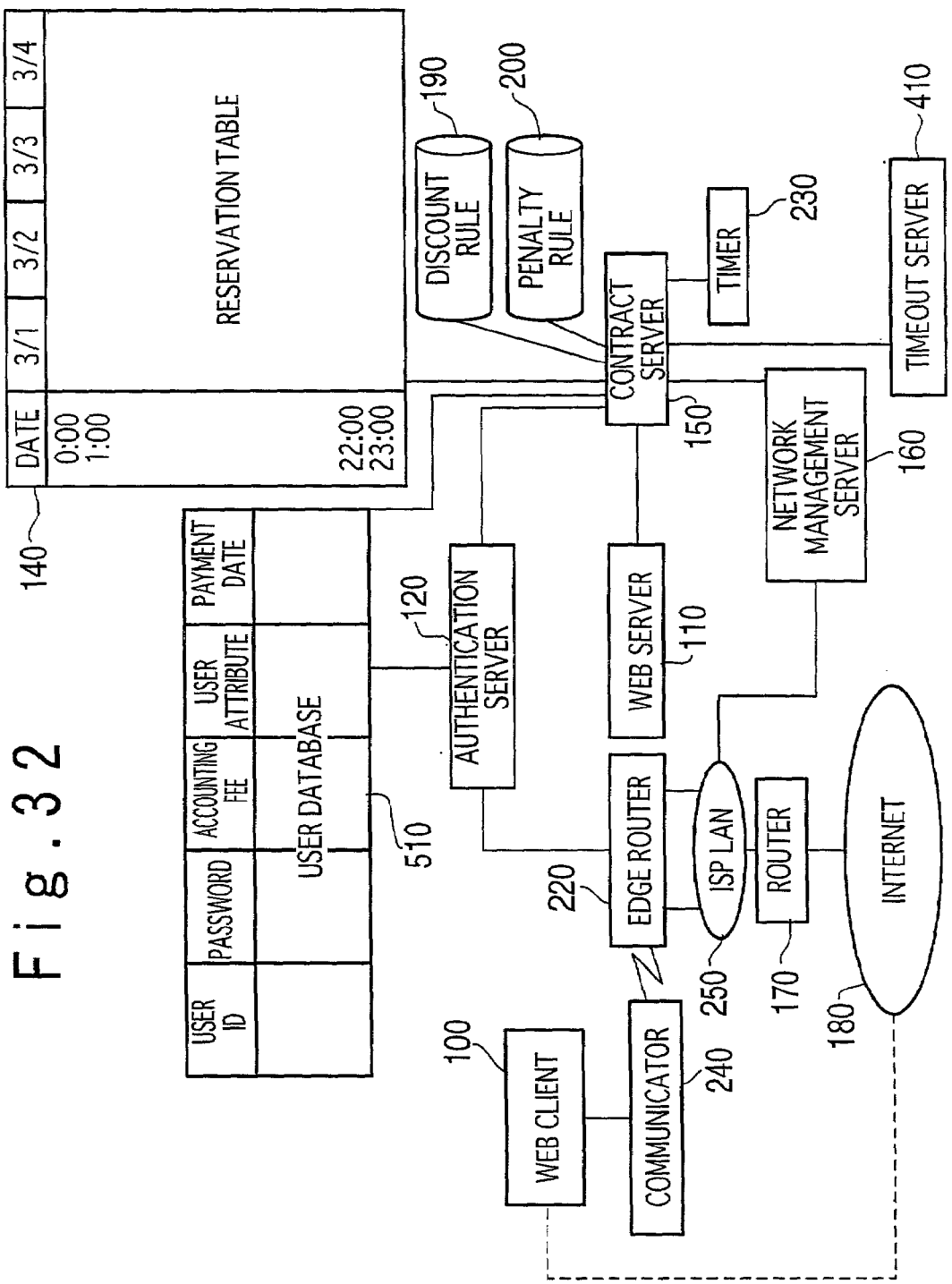

SYSTEM FOR AND A METHOD OF PROVIDING AN ONLINE TIME PERIOD RESERVING SERVICE, WHICH CAN PROTECT AN EXCESSIVE LOAD FROM BEING APPLIED TO A COMMUNICATION SYSTEM, IN ORDER TO PROVIDE A STABLE COMMUNICATION TO A USER

BACKGROUND OF THE INVENTION

1. Field of the Invention

The present invention relates to a system for and a method of providing an online time period reserving service. More particularly, the present invention relates to a system for and a method of providing an online time period reserving service, which can carry out a communication having a stable quality due to a reservation of a time period provided by an Internet connection dealer.

2. Description of the Related Art

An example of a user registration system of a conventional Internet connection dealer is disclosed in Japanese Laid Open Patent Application (JP-A-Heisei, 9-179905). In this conventional technique, as shown in FIG. 1, a proper access point 6 is selected from an access point table 3 noted in a personal computer 1. Then, a user information is registered in the access point 6. Accordingly, a new user is registered. By the way, in FIG. 1, a symbol 2 denotes a keyboard, a symbol 4 denotes a controller, a symbol 5 denotes a modem, a symbol 7 denotes a telephone line, and a symbol 8 denotes a host computer, respectively.

This registration method is also applied to the Internet connection dealer. So, an icon on a screen of the personal computer 1 can be clicked to conclude a contract with the Internet connection dealer on an online.

Also, as a conventional technique for keeping a quality on the Internet, there is RSVP (Resource ReserVation Protocol) defined on September 1997 by RFC 2205 (Request For Comments 2205). This method is the protocol for reserving a necessary band by requiring a necessary communication band from a transmission destination of a transmission source.

However, the conventional system has the following problems.

The first problem lies in a fact that it is difficult to keep a communication quality desired by a user.

This is because many users try to carry out communications at the same time, as compared with a communication facility of the Internet connection dealer. In order to protect such an event from occurring, there are a method of limiting the number of users and a method of employing a communication system for insuring a communication quality.

For example, the user registration system disclosed in Japanese Laid Open Patent Application (JP-A-Heisei, 9-179905) can provide the stable communication, though all of the users request communications at the same time, if the number of subscribers (users) to the Internet connection dealer is limited to the maximum number that can be allowed by the communication system of the dealer.

However, there is almost no case that all the users request the communications at the same time. Usually, the communications are carried out in only a range less than a power of the communication system. Thus, its efficiency is poor.

On the other hand, as the communication system for insuring the communication quality, there is the RSVP defined by the RFC 2205. However, as the second problem, there is the problem of the necessity of a facility investment cost to insure the communication quality such as the RSVP and the like.

This is because the introduction of the communication system corresponding to the RSVP requires all communication apparatuses on a communication route to introduce the devices corresponding to the RSVP.

By the way, as other conventional technical documents, there are Japanese Laid Open Patent Application (JP-A-Heisei, 11-15754), Japanese Laid Open Patent Application (JP-A-Heisei, 11-272711) and the like.

The technique disclosed in Japanese Laid Open Patent Application (JP-A-Heisei, 11-15754) is intended to reduce the number of connections to a provider in such a way that one user carries out a reservation registration for a plurality of communications, and one trial of a connection to the provider enables the plurality of communications to be executed in a batch manner. On the other hand, the present invention is intended to adjust reservations from a plurality of users, and thereby protect the many users from requesting communication services at a time, and accordingly insure the communication quality for users within a range of reservation receptions. Also, Japanese Laid Open Patent Application (JP-A-Heisei, 11-15754) is configured such that a module for carrying out a reservation process is installed on a side of a client (a communication terminal apparatus). This is because it is enough to adjust only a reservation from one user. On the other hand, in the present invention, the reservation process is installed in a server (a provider side). This is because it is necessary to install on the server side in order to adjust the reservations from the plurality of users. Also, since a typical Web client (actually, a browser) is assumed to be located on the user side, the mechanism (namely, the reservation process) peculiar to the present invention can not be installed in the client.

The technique disclosed in Japanese Laid Open Patent Application (JP-A-Heisei, 11-272711) is intended to avoid the occurrence of an excessive communication time because of a user interaction, an unstable communication and a thinness of a dialup line, by reserving a download of large information and collectively downloading it in a batch manner. On the other hand, the present invention is intended to provide a stable communication with a high quality to a user obtaining a reservation. The user obtaining the reservation can interactively download an information, similarly to a typical net surfing. Also, the technique disclosed in Japanese Laid Open Patent Application (JP-A-Heisei, 11-272711) is configured such that a function of reading out an information carries out the download instead of the user. On the other hand, in the present invention, a contract server carries out a control only as to whether an access of a user is filtered or passed, on the basis of a presence or absence of a reservation, and the download of a file is done by the user itself.

Japanese Laid Open Patent Application (JP-A, 2000-59359) discloses the following Internet connection method. In the Internet connection method having a subscriber terminal connected to an IP network, a WWW server for receiving a connection request to the Internet at the subscriber terminal, a customer information manager for storing an information of the subscriber terminal, and an accounting call meter for controlling the connection to the Internet of the subscriber terminal, the Internet connection method sends the connection request to the Internet from the subscriber terminal, and with regard to the connection request, the WWW server receives the information of the subscriber terminal corresponding to an IP address of the subscriber terminal, from the customer information manager, and the WWW server further reports the allowance or rejection of the connection to the Internet of the subscriber terminal, on the basis of the information of the subscriber terminal, to the accounting call meter.

Japanese Laid Open Patent Application (JP-A-Heisei, 10-31635) discloses the following portable electronic mail terminal. This is the portable electronic mail terminal that has a scheduling function, and sends and receives an electronic mail by using a radio communication, and then sending and receiving the electronic mail in a two-way, and it is further provided with: a radio communicator for sending and receiving the electronic mail; a schedule manager for managing a schedule of a user; a display for displaying a content of an electronic mail received by the radio communicator and a schedule managed by the schedule manager; a mail command decoder for decoding the electronic mail received by the radio communicator, and prompting the user to carry out an operation for invoking the schedule if a schedule invoking command is included as its content, and commanding the schedule manager to display the schedule of a day specified by the electronic mail on the display if the user carries out the operation of the schedule invoking command; and an input device for receiving the operation of the user and then sending the operational content to the mail command decoder and the schedule manager.

Japanese Laid Open Patent Application (JP-A-Heisei, 11-212995) discloses the following method of transmitting an information reservation. The method of transmitting an information reservation includes the steps of: specifying an information to be obtained, in a user terminal, a timing when the information is obtained, and a transmission destination of the obtained information; transmitting a data indicative of the specified information to be obtained, the timing and the transmission destination, through a communication network to a transmission server; and obtaining the information to be obtained, at the specified timing, on the basis of the sent data, in the transmission server, and then transmitting to the specified transmission destination.

Japanese Laid Open Patent Application (JP-A-Heisei, 11-328277) discloses the following reservation reception system. This reservation reception system is provided with: a terminal for inputting and outputting a data with regard to a reservation; a reservation judgment processor that is installed in a destination of a reservation and intended to carry out the processes including a reservation judgment, a transmission/reception and a registration of a data with regard to a reservation in the destination; and a collecting/delivering device for collecting/delivering the data with regard to the reservation between the terminal and the reservation judgment processor.

Japanese Laid Open Patent Application (JP-A-Heisei, 9-83678) discloses the following online advertisement system. In an information processing system that is connected to a network and intended to provide an advertisement of a sponsor through an online, in accordance with an access from a user, this online advertisement system is provided with: an advertisement information memory for storing an advertisement information including an access number of a free dial connected to the sponsor; and a communicator for sending the advertisement information to a user terminal when receiving an access request of the advertisement information from the user terminal through the network.

Japanese Patent No. 2998785 discloses the following user registration system. This is the user registration system for registering in a host computer the information necessary for a user registration at a time of a first setup of an electronic apparatus after a purchase of the electronic apparatus having a communication function, wherein the electronic apparatus has a modem for enabling a communication through a telephone line and an access point table for storing all access points that can be connected to the holt computer through the telephone line, and it also stores therein a program for commanding a built-in controller to execute a predetermined user registration operation at the time of the first setup, wherein when a user enters a user registration information containing at least a name and an address necessary for the user registration at the time of the first setup, the controller searches through the access point table on the basis of the address, and selects one access point, and connect to the host computer through the telephone line via the access point, and then stores the entered user registration information in the host computer through the online, and wherein as the predetermined user registration operation, the controller executes the steps of: judging whether or not the setup of the electronic apparatus is the first setup; prompting the user to enter the user registration information if it is judged as the first setup; searching for the one access point through the access point table on the basis of the entered address; and connecting to the host computer through the telephone line via the searched access point, and then sending the entered user registration information through the online.

SUMMARY OF THE INVENTION

The present invention is accomplished in view of the above mentioned problems. Therefore, an object of the present invention is to provide a system for and a method of providing an online time period reserving service, which can protect an excessive load from being applied to a communication system, in order to provide a stable communication to a user. Another object of the present invention is to provide a system for and a method of providing an online time period reserving service, which can protect an excessive load from being applied to a communication system, in order to provide a stable communication to a user, at a low cost, without any introduction of a new communication quality insurance system.

In order to achieve an aspect of the present invention, a system of reserving a connecting service to the internet at a time period, includes: a reservation table in which a state with regard to a reservation for a connecting service to the internet at a time period is stored; and a contract unit inputting a reserving demand to reserve the connecting service to the internet at a certain time period from a user to judge whether the reserving demand is permitted with reference to the reservation table.

In this case, the contract unit permits the reserving demand when the number of users connecting to the internet at a same time as the time period included in the reserving demand is smaller than or equal to a predetermined value.

Also in this case, the system of reserving a connecting service to the internet at a time period, further includes: a discount data storing unit storing a discount data to determine an accounting fee for the connecting service for a time period, and wherein the contract unit finds out a discountable time period with respect to the accounting fee of the connecting service with reference to the reservation table and the discount data to give a user a discount frame data showing the discountable time period and the accounting fee of the discountable time period.

Further in this case, the accounting fee is determined based on a remaining period until a starting time of a time period at which the user wants the connecting service to the internet, as the discount data.

In this case, the accounting fee is determined based on the state with regard to the reservation, as the discount data.

Also in this case, the accounting fee is determined based on a condition of a day of a time period at which the user wants the connecting service to the internet, of the week, as the discount data.

Further in this case, the accounting fee is determined such that a discount rate of the accounting fee is defined as being higher, the shorter the remaining period and the smaller the number of the reservations.

In this case, the system of reserving a connecting service to the internet at a time period, further includes: a penalty data storing unit storing a penalty data to determine a penalty if the user cancels the reservation, and wherein the contract unit gives the user a penalty information showing the penalty based on the penalty data.

Also in this case, the penalty is determined based on a remaining period until a starting time of a time period, included in the permitted reserving demand, at which the user wants the connecting service to the internet, as the penalty data.

In order to achieve another object of the present invention, a method of reserving a connecting service to the internet at a time period, includes: storing a reservation data indicating a state of a reservation for a connecting service to the internet at a time period; inputting a reserving demand to reserve the connecting service to the internet at a certain time period from a user; and judging whether the reserving demand is permitted based on the reservation data.

In this case, the reserving demand is permitted when the number of users connecting to the internet at a same time as the time period included in the reserving demand is smaller than or equal to a predetermined value.

Also in this case, the method of reserving a connecting service to the internet at a time period, further includes: storing a discount data to determine an accounting fee for the connecting service for a time period; finding out a discountable time period with respect to the accounting fee of the connecting service based on the reservation data and the discount data; and giving a user a discount frame data showing the discountable time period and the accounting fee of the discountable time period.

Further in this case, the accounting fee is determined based on a remaining period until a starting time of a time period at which the user wants the connecting service to the internet, as the discount data.

In this case, the accounting fee is determined based on the state of the reservation, as the discount data.

Also in this case, the accounting fee is determined based on a condition of a day of a time period at which the user wants the connecting service to the internet, of the week, as the discount data.

Further in this case, the accounting fee is determined such that a discount rate of the accounting fee is defined as being higher, the shorter the remaining period and the smaller the number of the reservations.

In this case, the method of reserving a connecting service to the internet at a time period, further includes: storing a penalty data to determine a penalty if the user cancels the reservation; and giving the user a penalty information showing the penalty based on the penalty data.

Also in this case, the penalty is determined based on a remaining period until a starting time of a time period, included in the permitted reserving demand, at which the user wants the connecting service to the internet, as the penalty data.

In order to achieve still another aspect of the present invention, a contract server to reserve a connecting service to the internet at a time period, includes: an input unit inputting a reserving demand to reserve a connecting service to the internet at a certain time period from a user; and a judging unit judging whether the reserving demand is permitted based on a state with regard to a reservation for a connecting service to the internet at a same time period as a time period at which the user wants the connecting service in the reserving demand.

In this case, the contract server permits the reserving demand when the number of users connecting to the internet at the same time as the time period at which the user wants the connecting service in the reserving demand is smaller than or equal to a predetermined value.

BRIEF DESCRIPTION OF THE DRAWINGS

FIG. 16 is a view showing a reservation confirmation page that is an actual example of the operations of the system for providing an online time period reserving service, according to the first embodiment;

FIG. 17 is a view showing a reservation determination page that is an actual example of the operations of the system for providing an online time period reserving service, according to the first embodiment;

FIG. 18 is a view showing a reservation list page that is an actual example of the operations of the system for providing an online time period reserving service, according to the first embodiment;

FIG. 19 is a view showing a cancel confirmation page that is an actual example of the operations of the system for providing an online time period reserving service, according to the first embodiment;

FIG. 32 is a block diagram showing a configuration of a system for providing an online time period reserving service, according to an eighth embodiment of the present invention.

DESCRIPTION OF THE PREFERRED EMBODIMENTS

Embodiments of the present invention will be described below in detail with reference to the attached drawings.

Figure 1:
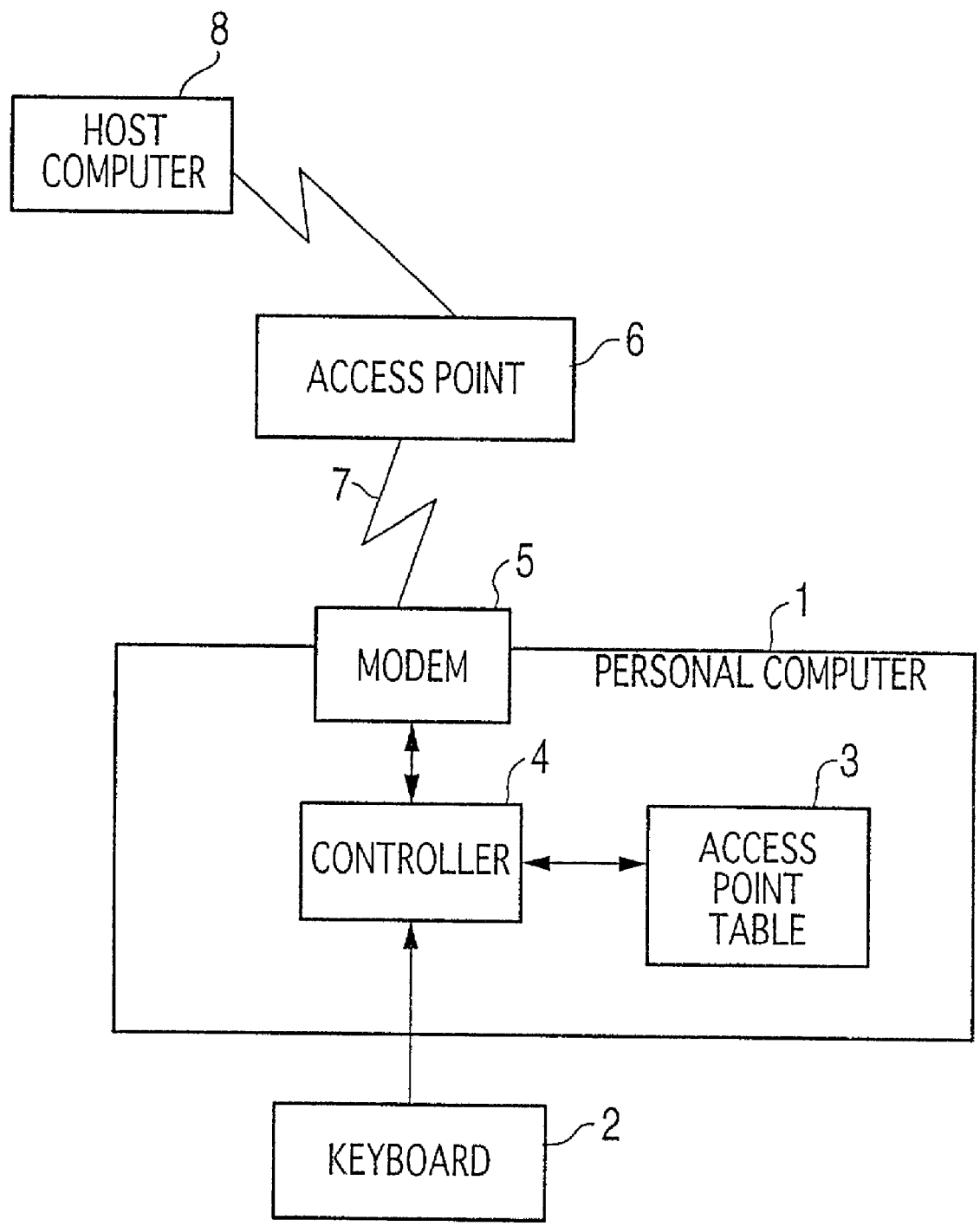
FIG. 1 is a block diagram showing an example of a conventional technique.
Figure 2:
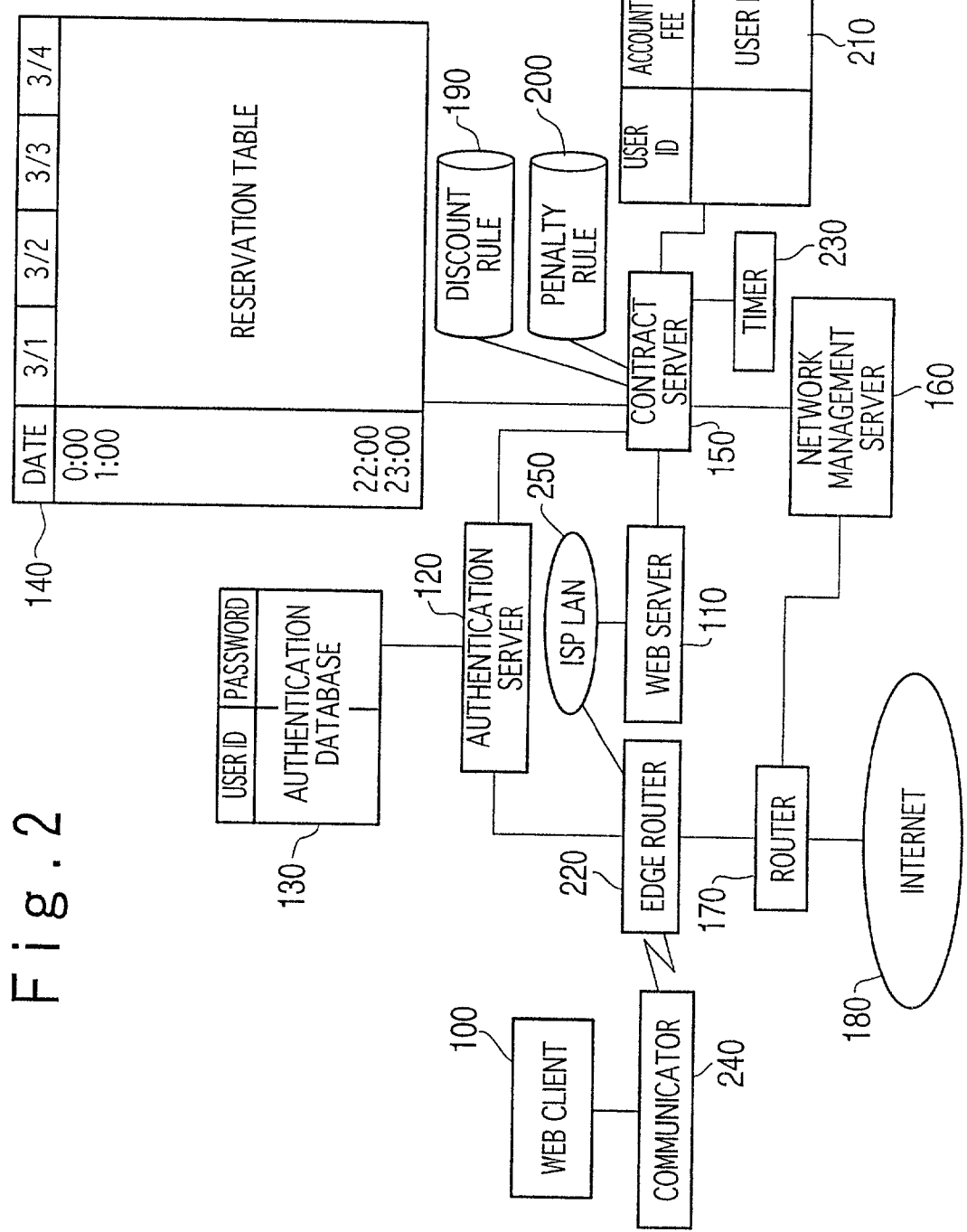
FIG. 2 is a block diagram showing a configuration of a system for providing an online time period reserving service, according to a first embodiment of the present invention.

FIG. 2 is a block diagram showing a configuration of a system for providing an online time period reserving service, according to a first embodiment of the present invention. In the system for providing an online time period reserving service according to this embodiment, its main body is provided with a Web client 100, a Web server 110, an authentication server 120, an authentication database 130, a reservation table 140, a contract server 150, a network management server 160, a router 170, an Internet 180, a discount rule 190, a penalty rule 200, a user database 210, an edge router 220, a timer 230, a communicator 240 and an ISP LAN 250.

The Web client 100 displays a page data sent by the Web server 110 and provides to a user. Also, it sends a data to the Web server 110 in accordance with the fact that the user actuates the Web client 100.

The communicator 240 mediates a communication from a user to an Internet connection dealer, and sends a communication data (packet) of the user to the Internet connection dealer, or sends a data from the Internet connection dealer to the user.

The edge router 220 receives the data from the communicator 240 and sends the data to the Internet 180 through the router 170 or the ISP LAN 250 that is a local area network within the Internet connection dealer.

The authentication server 120 receives a password and a user ID from the contract server 150 or the edge router 220, encrypts the password, and then judges whether or not an entry in coincidence with the encrypted password and the user ID exists on the authentication database 130. If the entry exists, it sends to the edge router 220 or the contract server 150 a fact that a legal authentication can be done. If the entry does not exist, it sends a fact that the authentication is failed.

The authentication database 130 manages the user ID and the encrypted password. If the password in which the entry represented by the user ID is encrypted coincides with an element in which a password given by the user is encrypted, this coincidence implies the successful authentication.

The Web server 110 sends a page data to the Web client 100 through the communicator 240 and the edge router 220, or receives a data from the Web client 100. The contract server 150 is connected to the Web server 110. The page data sent by the Web server 110 is prepared by the contract server 150.

The reservation table 140 is a list table of the reservations received by the Internet connection dealer. Only a certain number of users can carry out the reservations in the same time period. The reservation table 140 can be used to confirm a presence or absence of a reservation, a registration of a reservation and a tentative determination of a reservation.

The contract server 150, which is actuated by the Web server 110, carries out an authentication of a user, an access to the reservation table 140, an access to the user database 210 and a set of a reservation end time to the timer 230, and also prepares the page data to be displayed on the Web client 100, and then sends to the Web server 110. The contract server 150 controls a routing in accordance with the network management server 160. Moreover, the contract server 150 refers to the discount rule 190 and thereby calculates an accounting fee for each time period. Furthermore, the contract server 150 refers to the penalty rule 200 and thereby calculates a penalty in a case of a cancel of the reservation.

The network management server 160 controls the edge router 220 and the router 170. For example, the network management server 160 can limit a routing destination of the data prepared from a particular IP (Internet protocol) address, to the Internet 180 or the ISP LAN 250.

The discount rule 190 is the rule to determine an accounting fee for each time period. It provides the rule to calculate an accounting fee by using a reservation state and a remaining period until a contract validity date as parameters. That is, the discount rule 190 can use a remaining time until a connection start, a current achievement rate of a reservation and the like as the parameters and then calculate the accounting fee in the time period. The discount rule 190 also contains a calendar. Thus, the calculation of the accounting fee can be changed depending on a condition of a day of the week, a festival or the like.

The penalty rule 200 is the rule to determine a penalty if a user cancels a reservation. This is the rule to calculate the penalty on the basis of the information of a remaining period of a contract period and the like. That is, the penalty rule 200 is an calculation equation in which a remaining time until a reservation time period and the like are used as the parameters.

The user database 210 is the database for managing the user attributes, such as a user ID, an accounting fee, a payment date, a user name and the like. The accounting fee, the user attribute and the like can be retrieved or set with the user ID as a key.

The router 170 carries out a connection to the Internet 180. The router 170 can cooperate with the edge router 220 and then transfer a communication data of a user to the Internet 180, or filter it so as not to send.

The Internet 180 is the communication network through which computers over the world are connected.

The ISP LAN 250 is the local network within the Internet connection dealer. The edge router 220 and the Web server 110 are connected to the ISP LAN 250.

At a time of a lapse of the set reservation end time, the timer 230 reports the set user ID to the contract server 150. The reservation end time to the timer 230 and the user ID are set by the contract server 150.

The operations of the system for providing an online time period reserving service according to the first embodiment having the above-mentioned configuration will be described below in detail with reference to FIGS. 2, 3 and 4.

Figure 3:
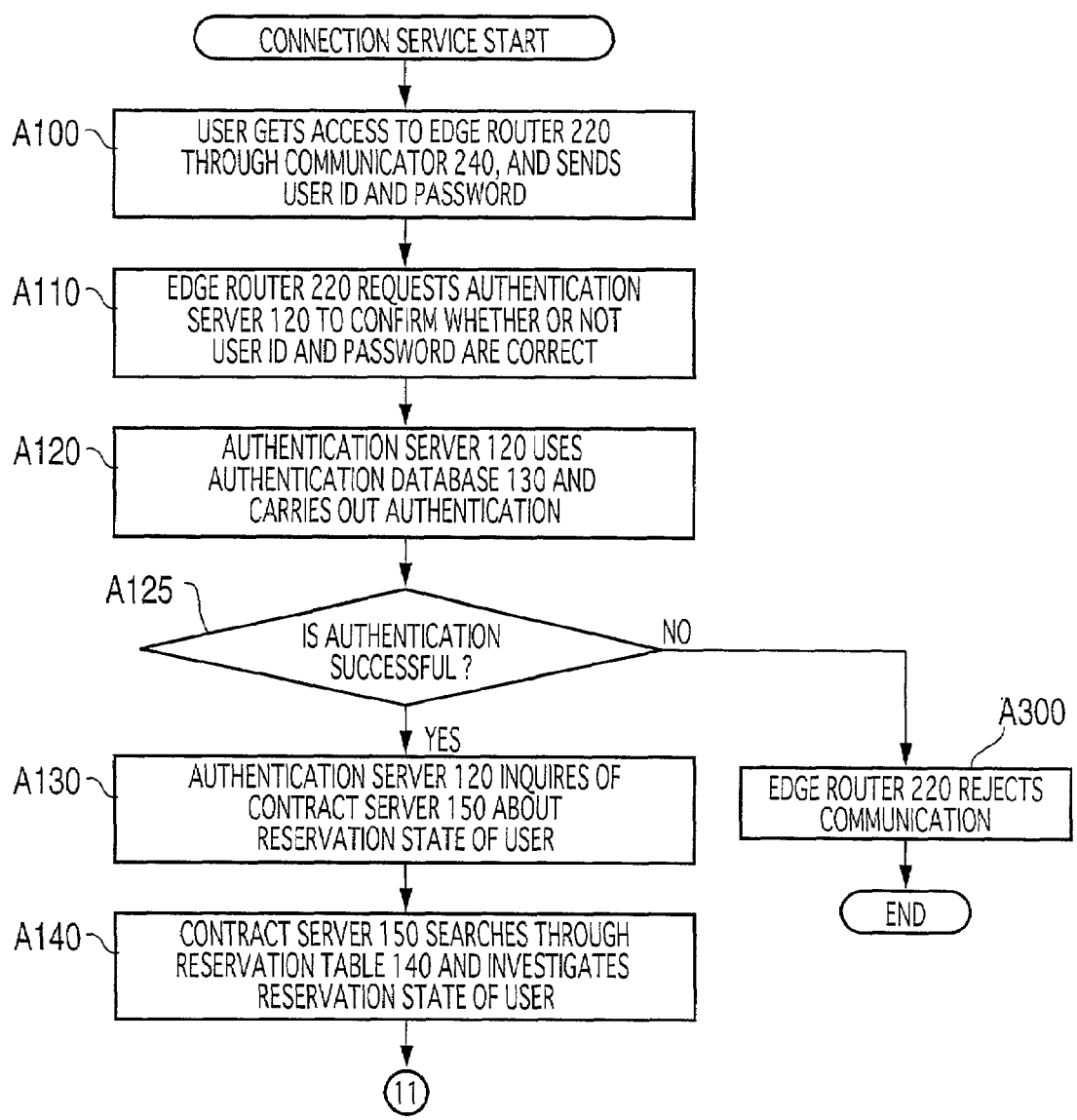
FIG. 3 is a part of a flowchart showing a connection process among operations of the system for providing an online time period reserving service, according to the first embodiment.
Figure 4:
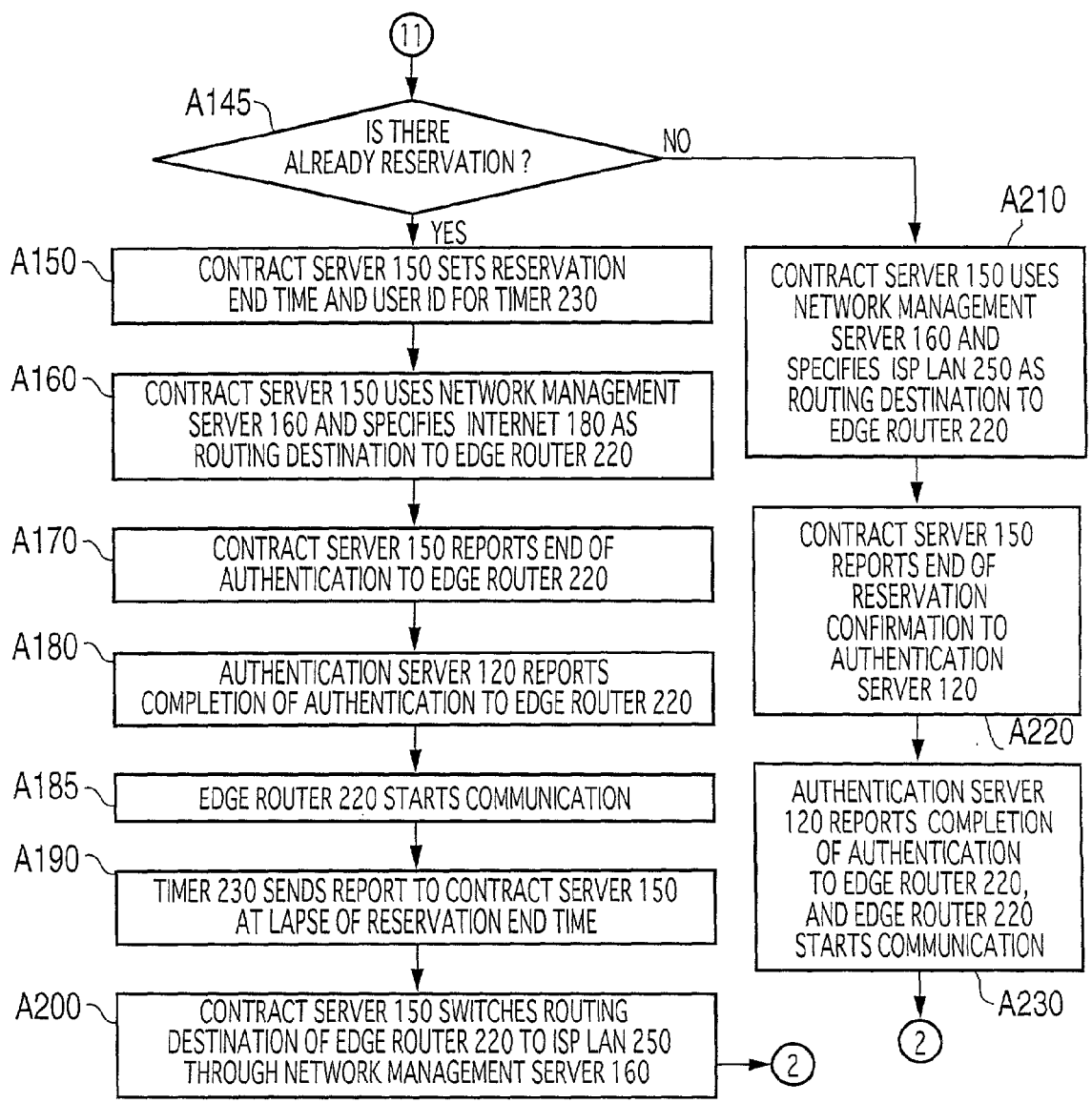
FIG. 4 is another part of the flowchart showing a connection process among operations of the system for providing an online time period reserving service, according to the first embodiment.

FIGS. 3 and 4 is a flowchart showing a procedure until a user is connected to an Internet connection dealer.

The user gets access to the edge router 220 through the communicator 240 from the Web client 100, and sends a user ID and a password to the edge router 220 (Step A100).

The edge router 220 passes the user ID and the password, which are received from the user, to the authentication server 120, and then requests the authentication (Step A110).

The authentication server 120 encrypts the password. On the other hand, it obtains an encrypted password from the authentication database 130 with the user ID as a key. Then, it compares an element in which the password given by the user is encrypted, with the encryption password obtained from the authentication database 130. If they coincide with each other, it determines that the authentication is successful, and if they do not coincide with each other, it determines that the authentication is unsuccessful (Step A120).

The processes on and after the step A130 are executed in the case of the successful authentication, and a process at a step A300 is executed in the case of the unsuccessful authentication (Step A125).

In the case of the unsuccessful authentication, the edge router 220 rejects the communication with the user (Step A300). The process is ended.

On the other hand, in the case of the successful authentication, the authentication server 120 inquires of the contract server 150 about a reservation state of a time period carried out by the user (Step A130).

The contract server 150 investigates a reservation state of a time period containing a current time of the reservation table 140 with the user ID as the key, and then judges whether or not this user reserves the time period containing the current time (Step A140).

If there is already a reservation, the processes on and after a step A150 are executed, and if there is no reservation, the processes on and after a step A210 are executed (Step A145).

If there is no reservation, the contract server 150 uses the network management server 160, and specifies the ISP LAN 250 as a routing destination of a communication data from the user to the edge router 220 (Step A210). Thus, the user can get access to the Web server 110 and use a reservation set service and a reservation confirmation service. However, it can not get access to the Internet 180.

Next, the contract server 150 reports the end of the reservation confirmation to the authentication server 120 (Step A220).

The authentication server 120 reports the completion of the authentication to the edge router 220. If the authentication is successful, the edge router 220 starts the routing to the ISP LAN 250 (Step A230).

Processes after this step will be described in a service menu process procedure (on and after a step B100).

On the other hand, if there is already the reservation, the contract server 150 sets the reservation end time and the user ID for the timer 230 (Step A150).

Next, the contract server 150 uses the network management server 160, and specifies to the edge router 220 the Internet 180 as a routing destination of a communication data from the Web client 100 (Step A160).

In succession, the contract server 150 reports the end of the reservation confirmation to the authentication server 120 (Step A170).

The authentication server 120 reports the completion of the authentication to the edge router 220 (Step A180).

The edge router 220 starts the communication (Step A185). That is, the edge router 220 routes the communication data of the user through the router 170 to the Internet 180. Since the edge router 220 routes the communication data of the user to the Internet 180, the user can be connected to the Internet 180.

The timer 230 sends the report including the user ID to the contract server 150 after the lapse of the reservation end time set by the contract server 150 (Step A190).

The contract server 150 uses the network management server 160, and commands the edge router 220 to stop routing to the Internet 180 and switch the routing destination to the ISP LAN 250 (Step A200). Thus, the user can not get access to the Internet 180.

After the completion of the switching operation of the edge router 220, the processes on and after the step B100 are executed similarly to the processes after a step A230.

The operations of the reservation reception will be described below in detail with reference to FIGS. 2, 5 and 6.

The user is getting access to the Web server 110 through the communicator 240, the edge router 220 and the ISP LAN 250 from the Web client 100. At first, the user uses the Web client 100, and gets access to a home page of a time period reservation service (Step B100).

The Web server 110 sends a login page data of the time period reservation service, for the access to the home page of the time period reservation service from the Web client 100 (Step B110).

When a login page of the time period reservation service is displayed on the Web client 100, the user enters a user ID and a password, in the displayed login page of the time period reservation service. The Web client 100 sends the user ID and the password to the Web server 110 (Step B120).

When receiving the password and the user ID through the communicator 240, the edge router 220 and the ISP LAN 250 from the Web client 100, the Web server 110 passes the received user ID and password through the contract server 150 to the authentication server 120, and then requests the authentication (Step B130).

The authentication server 120 encrypts the password. On the other hand, it obtains an encrypted password from the authentication database 130 with the user ID as a key. Then, the authentication server 120 compares an element in which the password given by the user is encrypted, with the encryption password obtained from the authentication database 130 (Step B140).

If they coincide with each other, the authentication is successful, and if they do not coincide with each other, the authentication is unsuccessful (Step B150). A process at a step B250 is executed in the case of the unsuccessful authentication, and the processes on and after a step B160 are executed in the case of the successful authentication.

In the case of the unsuccessful authentication, the contract server 150 prepares a page data of a login failure, and sends through the Web server 110, the ISP LAN 250, the edge router 220 and the communicator 240 to the Web client 100 (Step B250). Then, the process is ended.

In the case of the successful authentication, the contract server 150 prepares a service menu page data, and sends through the Web server 110, the ISP LAN 250, the edge router 220 and the communicator 240 to the Web client 100 (Step B160).

When a service menu page is displayed on the Web client 100, the user selects a service menu on the service menu page. The Web client 100 sends the menu selection result through the communicator 240, the edge router 220 and the ISP LAN 250 to the Web server 110 (Step B170).

The Web server 110 transfers the menu selection result to the contract server 150 (Step B180).

The contract server 150 branches it to a charging process (Step B210), a reporting process (Step B220) or a reserving process (Step B230), on the basis of the menu selection result (Steps B190, B200). Or, a logout is selected to then end the process.

The reserving process B230 will be described below in detail with reference to FIGS. 2, 7, 8 and 9.

The Web server 110 requests the contract server 150 to prepare a reservation page data (Step C110).

The contract server 150 refers to the reservation table 140, refers to a current reservation state, and generates a reservation state frame in which the time periods that are not filled up with reservations are gathered (Step C120).

Next, the contract server 150 collates the reservation state obtained from the reservation table 140 with the discount rule 190 to find out a discountable time period and calculate an accounting fee of the discountable time period, and write a time period having an very high discount rate to a discount frame (Step C130).

In succession, the contract server 150 integrates the reservation state frame and the discount frame into a reservation page data, and sends to the Web server 110 (Step C140).

The Web server 110 sends the reservation page data obtained from the contract server 150, through the ISP LAN 250, the edge router 220 and the communicator 240 to the Web client 100 (Step C150).

When the reservation page is displayed on the Web client 100, the user refers to a discount information and the reservation state represented on the reservation page, and reserves the time period. The Web client 100 sends a time period reservation request, which is the reservation result, through the communicator 240, the edge router 220 and the ISP LAN 250 to the Web server 110 (Step C160).

The Web server 110 transfers the time period reservation request from the Web client 100 to the contract server 150 (Step C170).

The contract server 150, after locking the reservation table 140 and stopping another access to the reservation table 140, refers to the reservation table 140, investigates the number of reservations in the time period on which the user performs the reservation request, and confirms whether or not it exceeds the acceptable number of reservations (Step C180).

If the reservation is acceptable, the processes on and after a step C220 are executed, and if the reservation is acceptable, the processes on and after a step C200 are executed (Step C190).

If the reservation is inacceptable, since it is filled up with the receivable number of reservations, the contract server 150 releases the lock of the reservation table 140, and sends a page data indicating that the reservation is impossible, to the Web server 110 (Step C200).

The Web server 110 sends the page data, which is sent from the contract server 150 and indicates that the reservation is inacceptable, through the ISP LAN 250, the edge router 220 and the communicator 240 to the Web client 100 (Step C210). Thus, the user can know the fact that the reservation is not accepted. Then, the reserving process B230 is ended, and the operational flow returns back to the step B160.

If the reservation can be received because of a small number of reservations, the contract server 150 writes [Reservation Request] to the corresponding time period of the reservation table 140, and releases the lock of the reservation table 140 (Step C220).

Next, the contract server 150 prepares a reservation confirmation page data, and sends it to the Web server 110 (Step C230). A reservation confirmation page is a page to provide the time period reserved by the user and an accounting fee and require the user to confirm the content.

The Web server 110 sends the reservation confirmation page data sent by the contract server 150, through the ISP LAN 250, the edge router 220 and the communicator 240 to the Web client 100 (Step C240).

When the reservation confirmation page is displayed on the Web client 100, the user views the reservation confirmation page on the Web client 100, and confirms the reservation. Then, the Web client 100 sends a reservation confirmation information indicative of a reservation confirmation or a reservation cancel through the communicator 240, the edge router 220 and the ISP LAN 250 to the Web server 110 (Step C250).

The Web server 110 receives the reservation confirmation information from the Web client 100 (Step C260).

Next, the Web server 110 transfers the reservation confirmation information to the contract server 150 (Step C270).

If the user already confirms the reservation from the reservation confirmation information, the processes on and after a step C290 are executed, and if the user cancels the reservation, the processes on and after a step C310 are executed (Step C280).

If the user already confirms the reservation, the contract server 150, the contract server 150 changes a mark of [Reservation Request] into a mark of [Reservation], and indicates that the reservation is determined. Also, the contract server 150 adds an accounting fee of a current reservation to an accounting fee of the user database 210, and rewrites it (Step C290).

Next, the contract server 150 prepares a reservation determination page data, and sends it to the Web server 110 (Step C300). In succession, it executes a process at a step C330.

On the other hand, if the user cancels the reservation in the reservation confirmation, the contract server 150 erases the mark of [Reservation Request] from the reservation table 140 (Step C310).

Next, the contract server 150 prepares a reservation cancel page data and sends to the Web server 110 (Step C320). In succession, it executes a process at a step C330.

At the step C330, the Web server 110 transfers the reservation determination page data or the reservation cancel page data obtained from the contract server 150, to the Web client 100. Then, the reserving process B230 is ended, and the operational flow returns back to the step B160.

Figure 10:
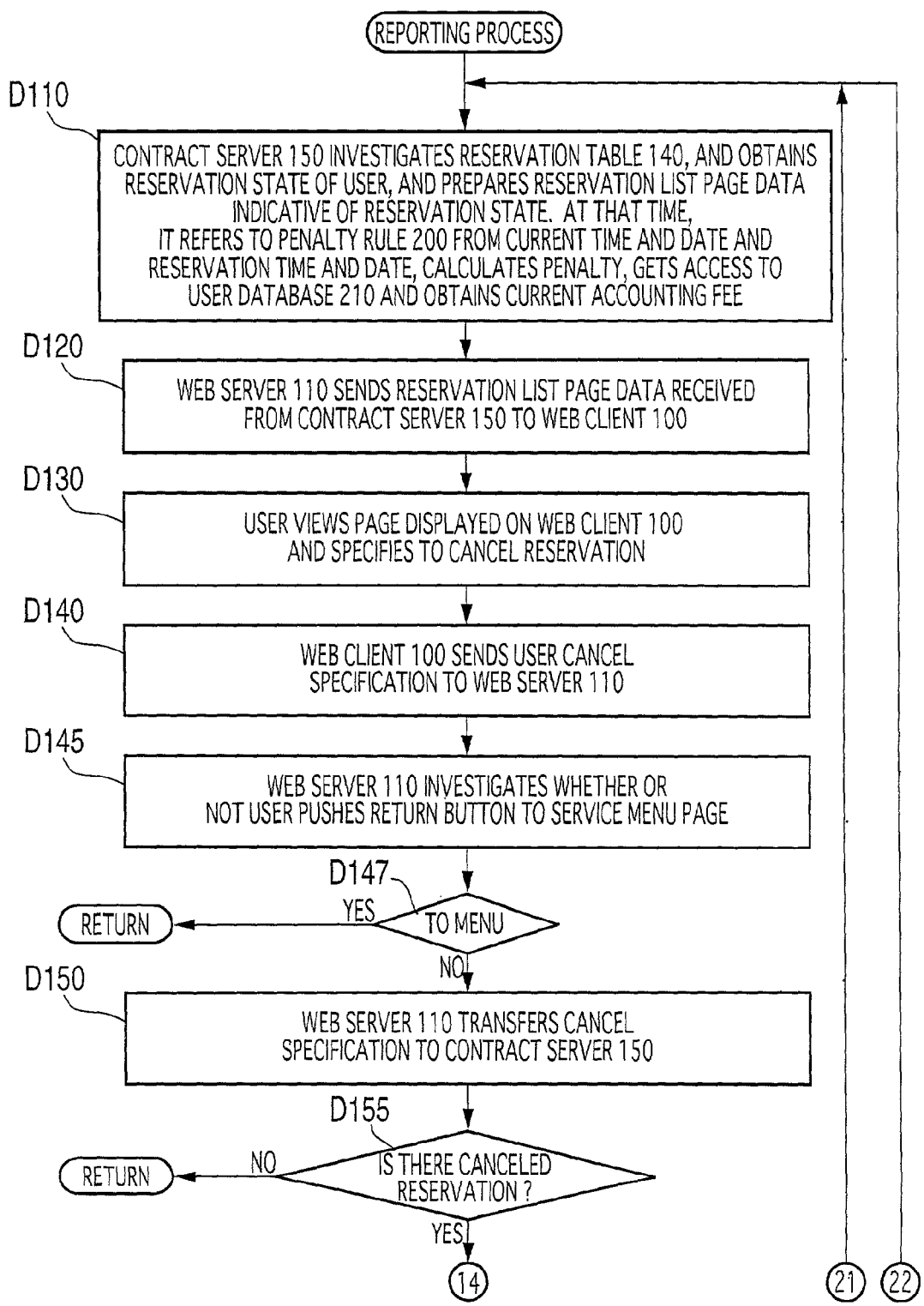
FIG. 10 is a part of a flowchart showing a reporting process among the operations of the system for providing an online time period reserving service, according to the first embodiment.
Figure 11:
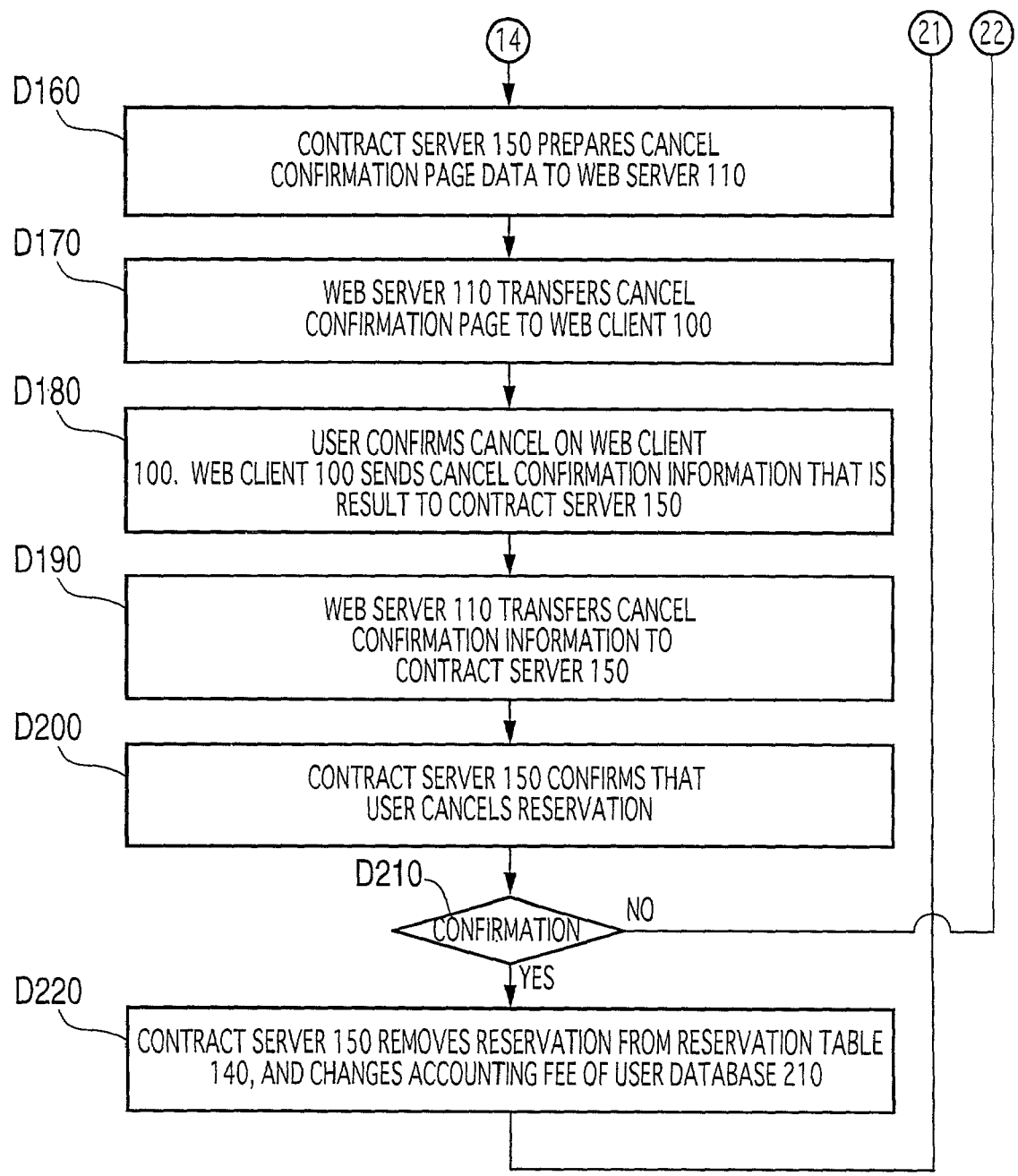
FIG. 11 is another part of the flowchart showing a reporting process among the operations of the system for providing an online time period reserving service, according to the first embodiment.

The reporting process B220 will be described below in detail with reference to FIGS. 2, 10 and 11.

At first, the contract server 150 investigates the reservation table 140 and obtains all reservation states of the user. At that time, the contract server 150 refers to the penalty rule 200, and calculates a penalty when a cancel is done for each reservation state. Next, the contract server 150 gets access to the user database 210, and obtains an accounting fee of the user until now. Then, the contract server 150 prepares a reservation list page data in which all the reservation states of the user, their penalties and their accounting fees are noted, and sends to the Web server 110 (Step D110).

The Web server 110 transfers the reservation list page data received from the contract server 150, through the ISP LAN 250, the edge router 220 and the communicator 240 to the Web client 100 (Step D120).

When a reservation list page is displayed on the Web client 100, the user views the reservation list page, and confirms whether or not there is a reservation to be canceled.

If there is a reservation to be canceled, it uses the Web client 100, and specifies one or a plurality of reservations to be canceled (Step D130).

The Web client 100 sends the cancel indication done by the user, through the communicator 240, the edge router 220 and the ISP LAN 250 to the Web server 110 (Step D140)

When the cancel specification is sent, the Web server 110 investigates whether or not the user pushes a return button to return back to the service menu page (Step D145). If the return button is pushed, the reporting process B220 is ended, and the operational flow returns back to the step B160. Or, the operational flow executes the processes on and after a step D150 (Step D147).

If the return button is not pushed, the Web server 110 transfers the cancel indication to the contract server 150 (Step D150).

The contract server 150 confirms whether or not there is a reservation to be canceled in the cancel indication (Step D155). If there is no reservation to be canceled, the reporting process B220 is ended, and the operational flow returns back to the step B160.

If there is a reservation to be canceled in the cancel indication, the contract server 150 prepares a cancel confirmation page data in accordance with the cancel indication. A list of cancel schedules indicated by the user is noted in the cancel confirmation page. Then, the contract server 150 sends the cancel confirmation page data to the Web server 110 (Step D160).

The Web server 110 transfers the cancel confirmation page data through the ISP LAN 250, the edge router 220 and the communicator 240 to the Web client 100 (Step D170).

When a cancel confirmation page is displayed on the Web client 100, the user views it and confirms the cancel. The Web client 100 sends it to the Web server 110 the cancel confirmation information indicating whether the cancel is confirmed or withdrawn (Step D180).

The Web server 110 transfers the cancel confirmation information to the contract server 150 (Step D190).

The contract server 150 confirms whether the user confirms the cancel of the reservation or withdraws the cancel of the reservation (Step D200).

If the user withdraws the cancel, the control is returned back to the step D110, and if the cancel is confirmed, the processes on and after a step D220 are executed (Step D210).

If the user confirms the cancel, the contract server 150 removes the reservation from the reservation table 140, and also adds a penalty corresponding to the canceled reservation to the accounting fee of the user database 210 (Step D220). Then, the operational flow returns back to the step D110.

Figure 12:
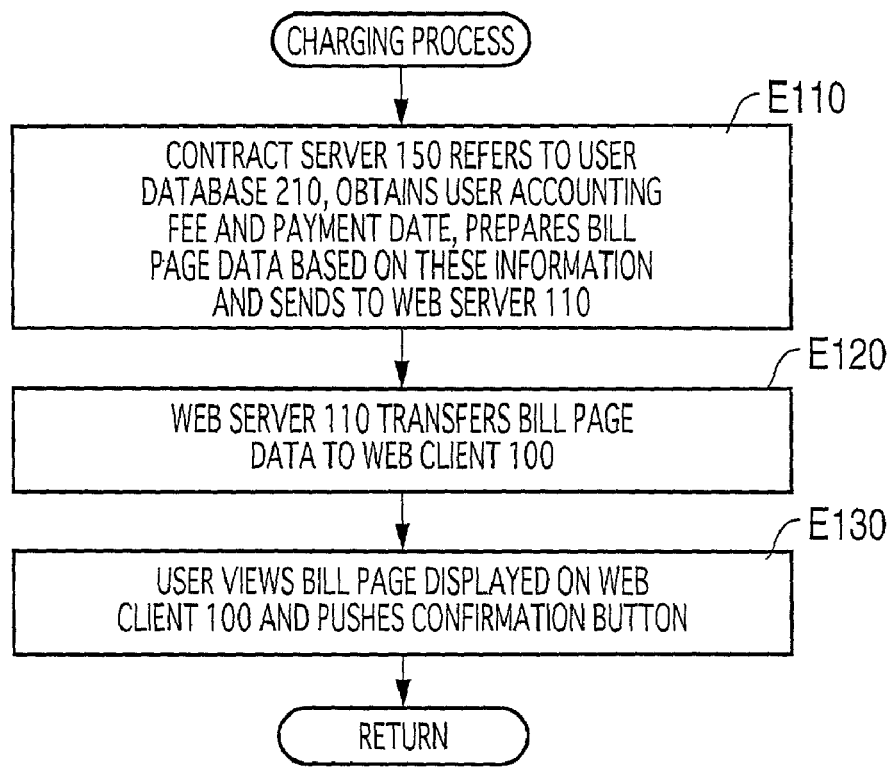
FIG. 12 is a flowchart showing a charging process among the operations of the system for providing an online time period reserving service, according to the first embodiment.

The charging process B210 will be described below in detail with reference to FIGS. 2, 12.

The contract server 150 refers to the user database 210, obtains the current accounting fee of the user and the payment date, prepares a bill page data having those information, and sends to the Web server 110 (Step E110).

The Web server 110 transfers the bill page data through the ISP LAN 250, the edge router 220 and the communicator 240 to the Web client 100 (Step E120).

When a bill page is displayed on the Web client 100, the user views the bill page, pushes a confirmation button and confirms the charged content (Step E130). Then, the user commands to return back to the menu on the Web client 100. So, the charging process B210 is ended.

The reserving process B230 will be described below with reference to an actual example.

Mr. Tanaka, who is a user, gets access to a home page of a time period reservation service through the communicator 240 by using Tanaka's user ID, "tanaka", and his password, "hogehoge", (Step A100). By the way, it is assumed that a current time is not included in any of time periods reserved by Mr. Tanaka.

The edge router 220 sends the user ID, "tanaka", and the password, "hogehoge", to the authentication server 120 (Step A110).

The authentication server 120 encrypts the password, "hogehoge", and, for example, obtains "a1b2c3d4e5". Next, the authentication server 120 retrieves an entry of the user ID, "tanaka", from the authentication database 130, and obtains the encrypted password, "a1b2c3d4e5". The data, "a1b2c3d4e5", in which the password given by Mr. Tanaka is encrypted coincides with the encryption password, "a1b2c3d4e5", within the authentication database 130. Thus, this coincidence implies that Mr. Tanaka' login is authenticated (Step A120).

Next, the authentication server 120 inquires of the contract server 150 about the reservation state of the time period requested by Mr. Tanaka (Step A310).

The contract server 150 investigates the reservation state of the time period containing the current time (for example, 18:55 on Feb. 24, 2000) of the reservation table 140, and confirms that there is no reservation of the user ID, "tanaka", in the reservation table 140 (Step A140).

Since Mr. Tanaka's reservation is not present, the contract server 150 uses the network management server 160, specifies the ISP LAN 250 as the routing destination of the authentication server 120, and limits an access to the Internet 180 (Step A210). Thus, Mr. Tanaka can get access to the ISP LAN 250. However, it can not get access to the Internet 180.

Next, the contract server 150 reports the end of the reservation confirmation to the authentication server 120 (Step A220).

The authentication server 120 reports the completion of the authentication to the edge router 220. The edge router 220 starts routing Mr. Tanaka's communication data to the ISP LAN 250 (Step A230).

Next, Mr. Tanaka uses the Web client 100, and gets access to the home page of the time period reservation service (Step B100).

The Web server 110 sends a login page data of the time period reservation service, in response to the access from the Web client 100 (Step B110).

Figure 13:
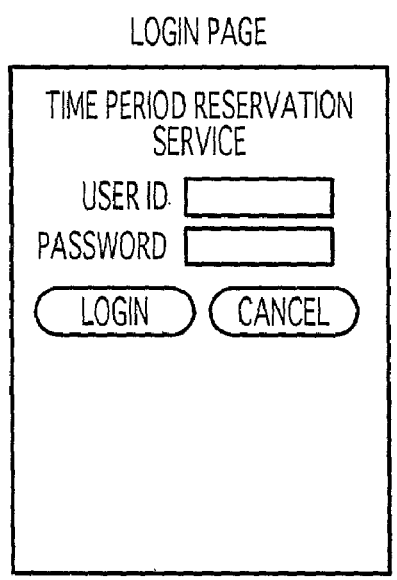
FIG. 13 is a view showing a login page that is an actual example of the operations of the system for providing an online time period reserving service, according to the first embodiment.

The Web client 100 displays a login page shown in FIG. 13. Mr. Tanaka writes "tanaka"to a column of a user ID, writes "hogehoge" to a column of a password, and pushes a [Login] button (Step B120). The Web client 100 sends the user ID, "tanaka", and the password, "hogehoge", to the Web server 110.

The Web server 110 sends the user ID, "tanaka", and the password, "hogehoge", through the contract server 150 to the authentication server 120 (Step B130).

The authentication server 120 encrypts the password, "hogehoge", and obtains "a1b2c3d4e5". On the other hand, it retrieves the entry of the user ID, "tanaka", from the authentication database 130 and obtains the encrypted password, "a1b2c3d4e5". The data, "a1b2c3d4e5", in which the password given by Mr. Tanaka is encrypted coincides with the encryption password, "a1b2c3d4e5", within the authentication database 130. Thus, this coincidence implies that Mr. Tanaka' login is authenticated (Step B140). Then, the authentication server 120 reports the authentication result to the contract server 150.

Figure 14:
FIG. 14 is a view showing a service menu page that is an actual example of the operations of the system for providing an online time period reserving service, according to the first embodiment.

Since the authentication is successful, the contract server 150 prepares a service menu page data shown in FIG. 14, and sends through the Web server 110 to the Web client 100 (Step B160).

Mr. Tanaka specifies [Reservation Reception] by using a radio button of a service menu page shown in FIG. 14 displayed on the Web client 100, and pushes an [OK] button. The Web client 100 reports to the Web server 110 the fact that the user selects [Reservation Reception] (Step B170).

The Web server 110 transfers to the contract server 150 the fact that Mr. Tanaka selects [Reservation Reception] (Step B180).

The contract server 150 executes the reserving process B230.

In detail, the Web server 110 requests the contract server 150 to prepare a reservation page data with regard to Mr. Tanaka (Step C110).

The contract server 150 refers to the reservation table 140, confirms a current reservation state, and generates a reservation state frame (Step C120).

Next, the contract server 150 collates the reservation state obtained from the reservation table 140 with the discount rule 190, and retrieves a discountable time period. For example, let us suppose that the current time is Mar. 24, 2000 and only one reservation is scheduled for the time period from 4:00 to 10:00 on March 25. According to the discount rule 190, the discount rate is defined as being higher, the shorter the remaining period and the smaller the number of reservations of a time period.

The contract server 150 writes the time period to the discount frame, since the time period from 4:00 to 10:00 has the high discount rate, as the result of the collation with the discount rule 190 (Step C130).

Next, the contract server 150 integrates the reservation state frame and the discount frame into the reservation page data, and sends to the Web server 110 (Step C140).

The Web server 110 sends the reservation page data through the ISP LAN 250, the edge router 220 and the communicator 240 to the Web client 100 (Step C150).

Figure 15:
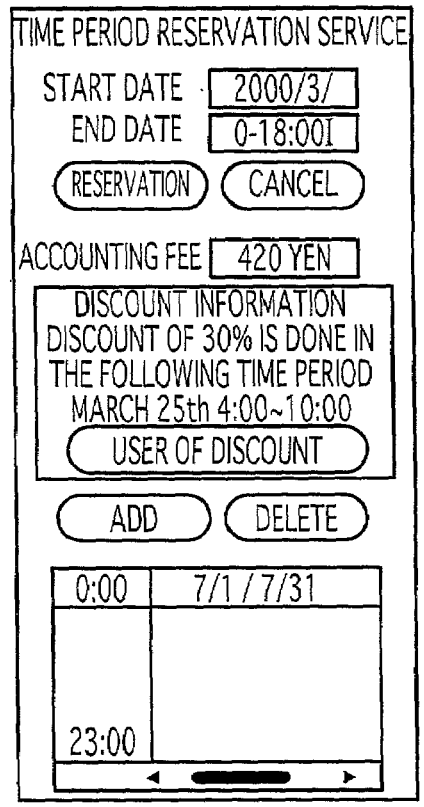
FIG. 15 is a view showing a reservation page that is an actual example of the operations of the system for providing an online time period reserving service, according to the first embodiment.

The Web client 100 displays a reservation page shown in FIG. 15. It is a discount frame that is located at a central portion of FIG. 15, and it is a reservation state frame that is located at a lower portion of FIG. 15. The reservation state frame indicates a reservation state in a particular time period, in which a horizontal axis denotes a date and a vertical axis denotes a time. Mr. Tanaka views the reservation page, and writes a time period from 10:00 to 17:00 on Mar. 26, 2000 as a desirable reservation time period composed of a start date and an end date, to an upper portion of the reservation page, and pushes a [Reservation] button, and then sends a time period reservation request to the Web server 110 (Step C160). By the way, it is possible to push an [Addition] button and thereby register a plurality of reservation requests and then send them by using the [Reservation] button.

The Web server 110 receives the time period reservation request from the Web client 100 and transfers to the contract server 150 (Step C170).

The contract server 150 locks the reservation table 140 so that another time period reservation request can not be written. Then, the contract server 150 refers to the reservation table 140 and confirms whether or not the time period reservation request can be accepted (Step C180).

If the maximum number of reservations is not exceeded in the time period indicated by the reservation request, the contract server 150 determines that the reservation is acceptable (Step C190).

Then, the contract server 150 writes to the reservation table 140 the mark [Reservation Request] indicative of the fact of the time period reservation request from the user ID, "tanaka", and releases the lock of the reservation table 140 (Step C220).

Next, the contract server 150 prepares a page data of a reservation confirmation page shown in FIG. 16, in accordance with the reservation request. At that time, it refers to the discount rule 190 and calculates an accounting fee. So, it is reflected in a reservation confirmation page data. Then, the contract server 150 sends the reservation confirmation page data to the Web server 110 (Step C230).

The Web server 110 transfers the reservation confirmation page data sent by the contract server 150, through the ISP LAN 250, the edge router 220 and the communicator 240 to the Web client 100 (Step C240).

Mr. Tanaka views the reservation confirmation page shown in FIG. 16 displayed on the Web client 100. With reference to FIG. 16, the reservation confirmation page represents the start time, the end time and the accounting fee with regard to the reservation requested by Mr. Tanaka. Thus, Mr. Tanaka confirms that the reservation request is received without any error, and then pushes a [Reservation Determination] button (Step C250).

The Web server 110 receives a reservation confirmation information from the Web client 100 (Step C260), and transfers to the contract server 150 (Step C270)

It confirms the determination of the reservation (Step C280) and changes the mark of [Reservation Request] written to the reservation table 140, into the mark of [Reservation] indicating that the user ID, "tanaka", is already reserved. Thus, the reservation is determined. Also, the contract server 150 adds an accounting fee of a current reservation to Mr. Tanaka's accounting fee in the user database 210, and rewrites it (Step C290).

Next, the contract server 150 prepares a page data of a reservation determination page shown in FIG. 17 and sends it to the Web server 110 (Step C300).

The Web server 110 transfers the reservation determination page data obtained from the contract server 150, through the ISP LAN 250, the edge router 220 and the communicator 240 to the Web client 100 (Step C330).

Mr. Tanaka checks [To Menu] from radio buttons on the reservation determination page shown in FIG. 17, pushes the [OK] button, and indicates the service menu page shown in FIG. 14.

The reporting process B220 will be described below with reference to an actual example.

Mr. Tanaka gets access to the home page of the time period reservation service in order to correct the reservation. At that time, the processes from the steps A100 to A230 and the processes from the steps B100 to B160 are equal to those of the case in the reserving process B230. Thus, the detailed explanations are omitted, and the reporting process B220 is centrally described.

Mr. Tanaka selects [Reservation Confirmation And Correction] from the radio buttons of the service menu page shown in FIG. 14, and pushes the [OK] button. So, the Web client 100 sends the menu selection result after the selection of [Reservation Confirmation And Correction] to the Web server 110 (Step B170).

The Web server 110 transfers the menu selection result after the selection of [Reservation Confirmation And Correction] to the contract server 150 (Step B180).

The contract server 150 executes the reporting process B220 (Step B200).

In detail, the contract server 150 investigates the reservation table 140 and gathers all reservation states reserved under Mr. Tanaka's user ID, "tanaka",. With regard to Mr. Tanaka's penalties, the contract server 150 refers to the penalty rule 200 and calculates a penalty for each reservation when Mr. Tanaka cancels the reservation state. In succession, the contract server 150 gets access to the user database 210 and obtains Mr. Tanaka's accounting fee until now. Next, the contract server 150 prepares a page data of a reservation list page shown in FIG. 18 from Mr. Tanaka's all reservation states, their penalties and the accounting fee, and sends to the Web server 110 (Step D110).

The Web server 110 sends the reservation list page data through the ISP LAN 250, the edge router 220 and the communicator 240 to the Web client 100 (Step D120).

Let us suppose that Mr. Tanaka views a reservation list page shown in FIG. 18 displayed on the Web client 100 and that he tries to cancel a reservation specified in a time period from 10:00 to 17:00 on Mar. 30, 2000. Mr. Tanaka checks a cancel button of the reservation in the time period from 10:00 to 17:00 on Mar. 30, 2000, and pushes a [Confirmation] button (Step D130).

The Web client 100 sends Mr. Tanaka's cancel indication to the Web server 110 (Step D140).

Mr. Tanaka's indication is not the [To Menu] button, and it is the [Confirmation] button. So, the Web server 110 transfers the cancel indication to the contract server 150 (Step D150).

The contract server 150 confirms that the cancel indication includes at least one reservation to be canceled (Step D155).

Next, the contract server 150 prepares a page data of a cancel confirmation page shown in FIG. 19, and sends to the Web server 110 (Step D160).

The Web server 110 transfers the cancel confirmation page data through the ISP LAN 250, the edge router 220 and the communicator 240 to the Web client 100 (Step D170).

Mr. Tanaka views the cancel confirmation page shown in FIG. 19 displayed on the Web client 100, and pushes the [Confirmation] button, and then confirms the cancel. The Web client 100 sends Mr. Tanaka's cancel confirmation information to the Web server 110 (Step D180).

The Web server 110 transfers the cancel confirmation information to the contract server 150 (Step D 190).

The contract server 150 confirms that the user canceled the reservation (Step D200).

If Mr. Tanaka confirms the cancel (Step D210), the contract server 150 removes Mr. Tanaka's user ID, "tanaka", from the reservation for [10:00 to 17:00 on Mar. 30, 2000] in the reservation table 140, and also adds the penalty corresponding to the canceled reservation to the accounting fee of the user database 210 (Step D210). Then, the operational flow returns back to the step D110. So, the reservation list page data is again prepared.

The charging process B210 will be described below with reference to an actual example.

Mr. Tanaka gets access to the home page of the time period reservation service in order to confirm the reservation state. At that time, the processes from the steps A100 to A230 and the processes from the steps B100 to B160 are equal to those of the case in the reserving process B230. Thus, the detailed explanations are omitted, and the charging process B210 is centrally described.

Mr. Tanaka selects [Accounting Confirmation] from the radio buttons of the service menu page shown in FIG. 14, and pushes the [OK] button. So, the Web client 100 sends the menu selection result after the selection of [Accounting Confirmation] to the Web server 110 (Step B170).

The Web server 110 transfers the menu selection result after the selection of [Accounting Confirmation] to the contract server 150 (Step B180).

The contract server 150 executes the charging process B210 (Step B200).

Figure 20:
FIG. 20 is a view showing a bill page that is an actual example of the operations of the system for providing an online time period reserving service, according to the first embodiment.

In detail, the contract server 150 refers to the user database 210, obtains Mr. Tanaka's current accounting fee and its payment date, and prepares a page data of a bill page shown in FIG. 20 from their information, and then sends it to the Web server 110 (Step E110).

The Web server 110 transfers the bill page data to the Web client 100 (Step E120).

Mr. Tanaka views a bill page shown in FIG. 20 displayed on the Web client 100, and pushes the [Menu] button (Step E130). So, the Web client 100 sends the fact that the [Menu] button is pushed to the Web server 110.

The Web server 110 transfers the fact that the [Menu] button is pushed to the contract server 150. Then, the operational flow proceeds to the step B160.

The connecting process will be described below with reference to an actual example.

Mr. Tanaka gets access to the edge router 220 by using the user ID, "tanaka", and the password, "hogehoge", through the communicator 240 from the Web client 100, at 10:01 on Mar. 26, 2000 included in the reserved time period (Step A100).

The edge router 220 passes the user ID and the password, which are received from the user, to the authentication server 120, and then requests the authentication (Step A110).

The authentication server 120 encrypts the password, "hogehoge", and obtains "a1b2c3d4e5". On the other hand, it searches for an entry of the user ID, "tanaka", through the authentication database 130, and obtains its encrypted password, "a1b2c3d4e5",. The data, "a1b2c3d4e5", in which the password given by Mr. Tanaka is encrypted coincides with the encryption password, "a1b2c3d4e5", within the authentication database 130. Thus, this coincidence implies that Mr. Tanaka' login is authenticated (Step A120).

Next, the authentication server 120 inquires of the contract server 150 about Mr. Tanaka's reservation state (Step A130) The contract server 150 investigates a reservation state of a time period containing a current time, "10:01 on Mar. 26, 2000", of the reservation table 140 with the user ID, "tanaka", as the key (Step A140), and confirms that it is already reserved as the user ID, "tanaka", in the reservation table 140 (Step A145).

The contract server 150 sets Mr. Tanaka's reservation end time, "17:00 on Mar. 26, 2000", and the user ID, "tanaka", for the timer 230. A report to the contract server 150 is generated at the reservation end time (Step A150).

Next, the contract server 150 uses the network management server 160, and sets the Internet 180 as the routing destination for the edge router 220. Accordingly, Mr. Tanaka establishes the connection to the Internet 180 (Step A160).

In succession, the contract server 150 reports the end of the reservation confirmation to the authentication server 120 (Step A170).

The authentication server 120 reports the completion of the authentication to the edge router 220 (Step A180).

The edge router 220 starts the communication (Step A185).

At 17:00 on Mar. 26, 2000, the timer 230 reports the lapse of Mr. Tanaka's reservation end time to the contract server 150 (Step A190).

The contract server 150 uses the network management server 160, and cuts away the connection to Mr. Tanaka's Internet 180 from the edge router 220 (Step A200).

Then, the processes on and after the step B100 are executed.

(2) Second Embodiment

Figure 21:
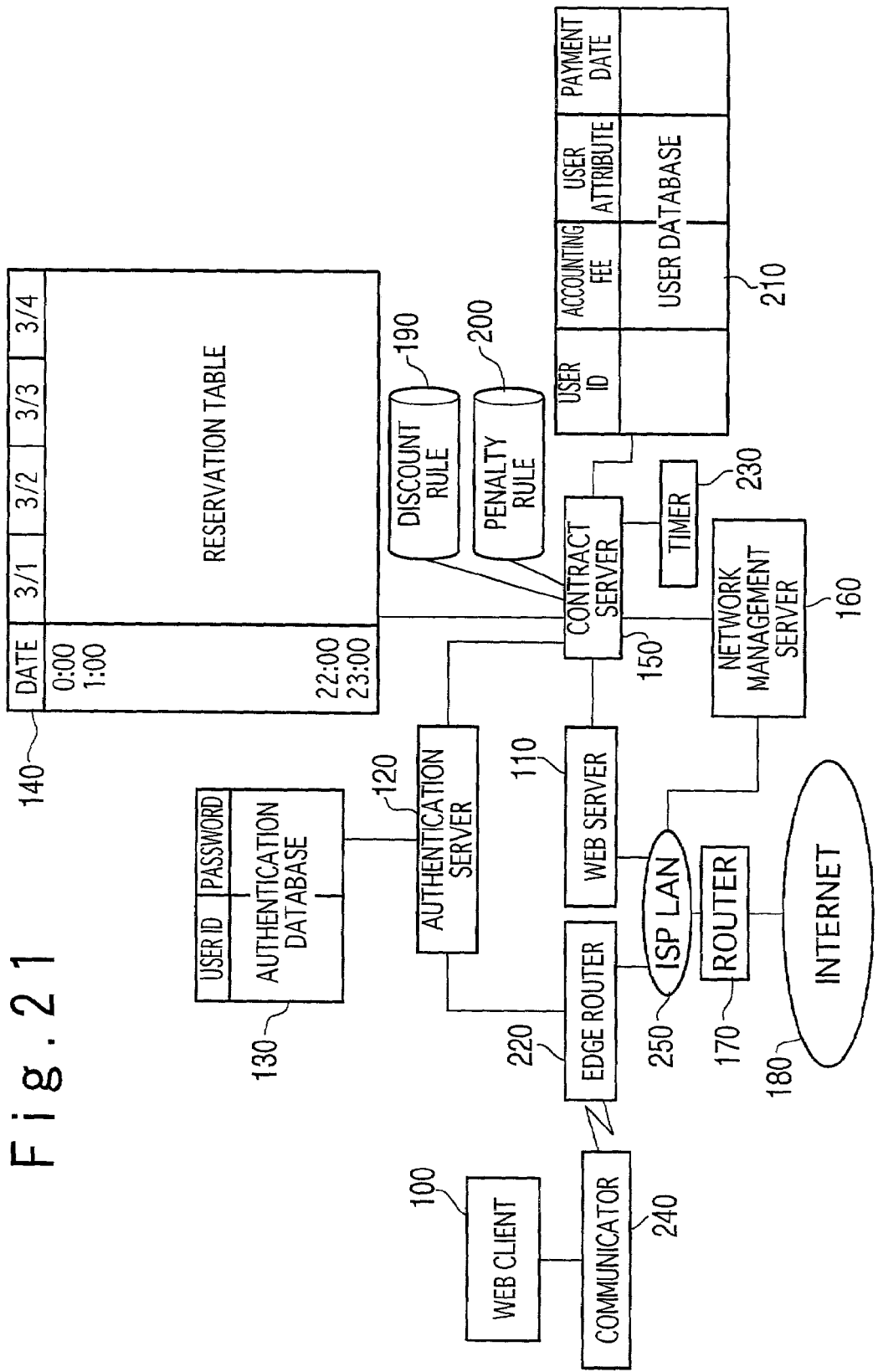
FIG. 21 is a block diagram showing a configuration of a system for providing an online time period reserving service, according to a second embodiment of the present invention.

With reference to FIG. 21, in a system for providing an online time period reserving service according to a second embodiment of the present invention, the ISP LAN 250 is further connected to the network management server 160 and the router 170 and connected through the router 170 to the Internet 180, although in the system for providing an online time period reserving service according to the first embodiment shown in FIG. 2, the ISP LAN 250 is connected only to the edge router 220 and the Web server 110 and separated from the Internet 180.

The Web server 110 does not communicate with the Web client 100 through the edge router 220. It is connected through the ISP LAN 250, the router 170 and the Internet 180 to the Web client 100.

Accordingly, the user can use the time period reservation if the user is located at a place where the user can get access to the Internet 180 without any usage of the edge router 220.

Also, the edge router 220 is designed such that all components are connected to the Internet 180 if the connection request from the user is authenticated.

By the way, the other members are configured perfectly similarly to those of the system for providing an online time period reserving service according to the first embodiment. Thus, the same symbols are given to the corresponding parts. So, their detailed explanations are omitted.

The operations of the system for providing an online time period reserving service according to the second embodiment having the above-mentioned configuration will be described below.

At first, a service menu process of the system for providing an online time period reserving service according to the second embodiment is described.

The user uses any device so that the Web client 100 can get access to the Internet 180. The user gets access to the Web server 110 in the Web client 100, and reads the home page of the time period reservation service (Step B100).

The operations on and after the step B110 are equal to those of the case of the system for providing an online time period reserving service according to the first embodiment. Thus, their explanations are omitted.

The connecting process of the time period reservation service in the system for providing an online time period reserving service according to the second embodiment will be described below.

Figure 22:
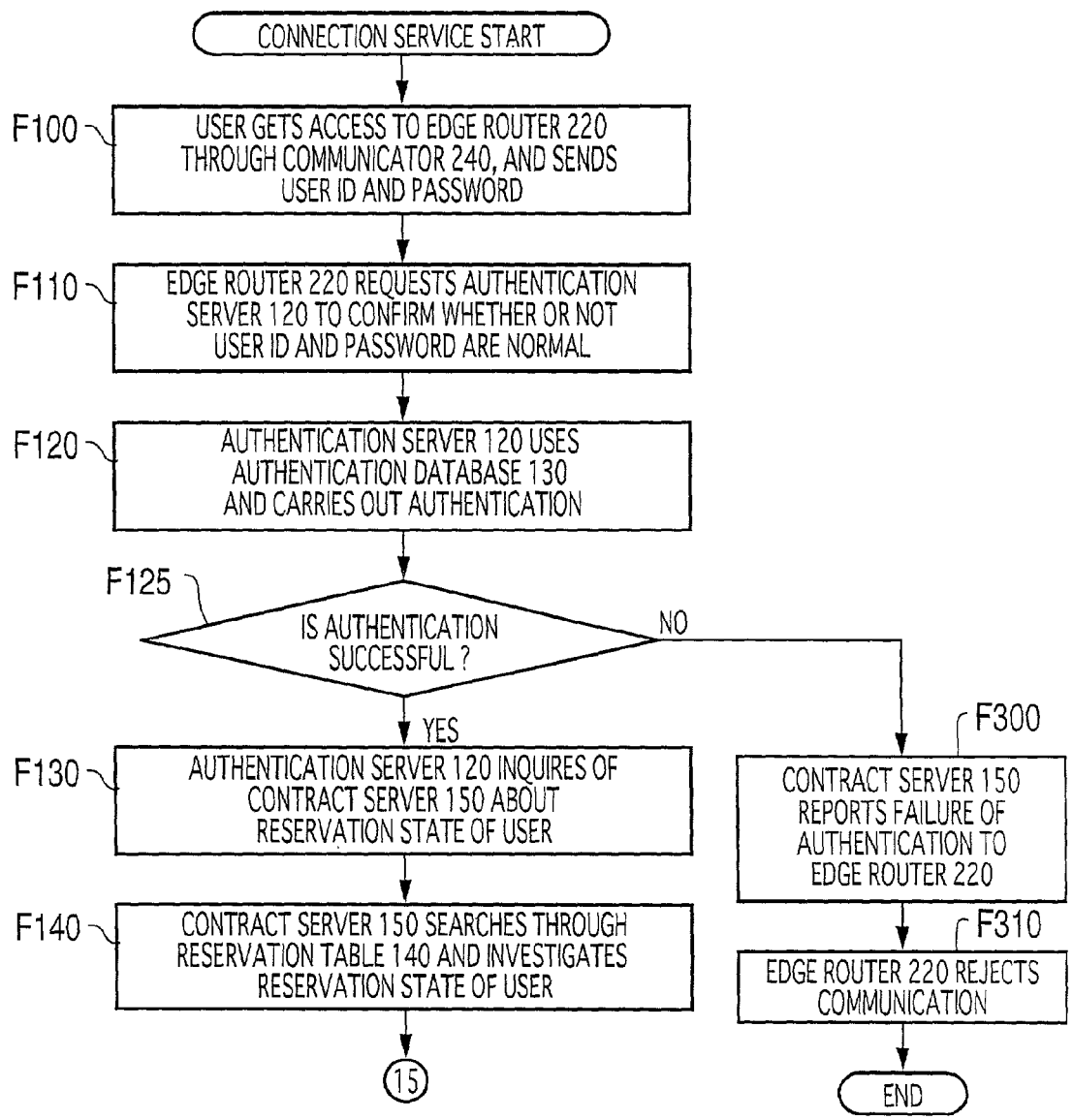
FIG. 22 is a part of a flowchart showing a connection process among operations of the system for providing an online time period reserving service, according to the second embodiment.
Figure 23:
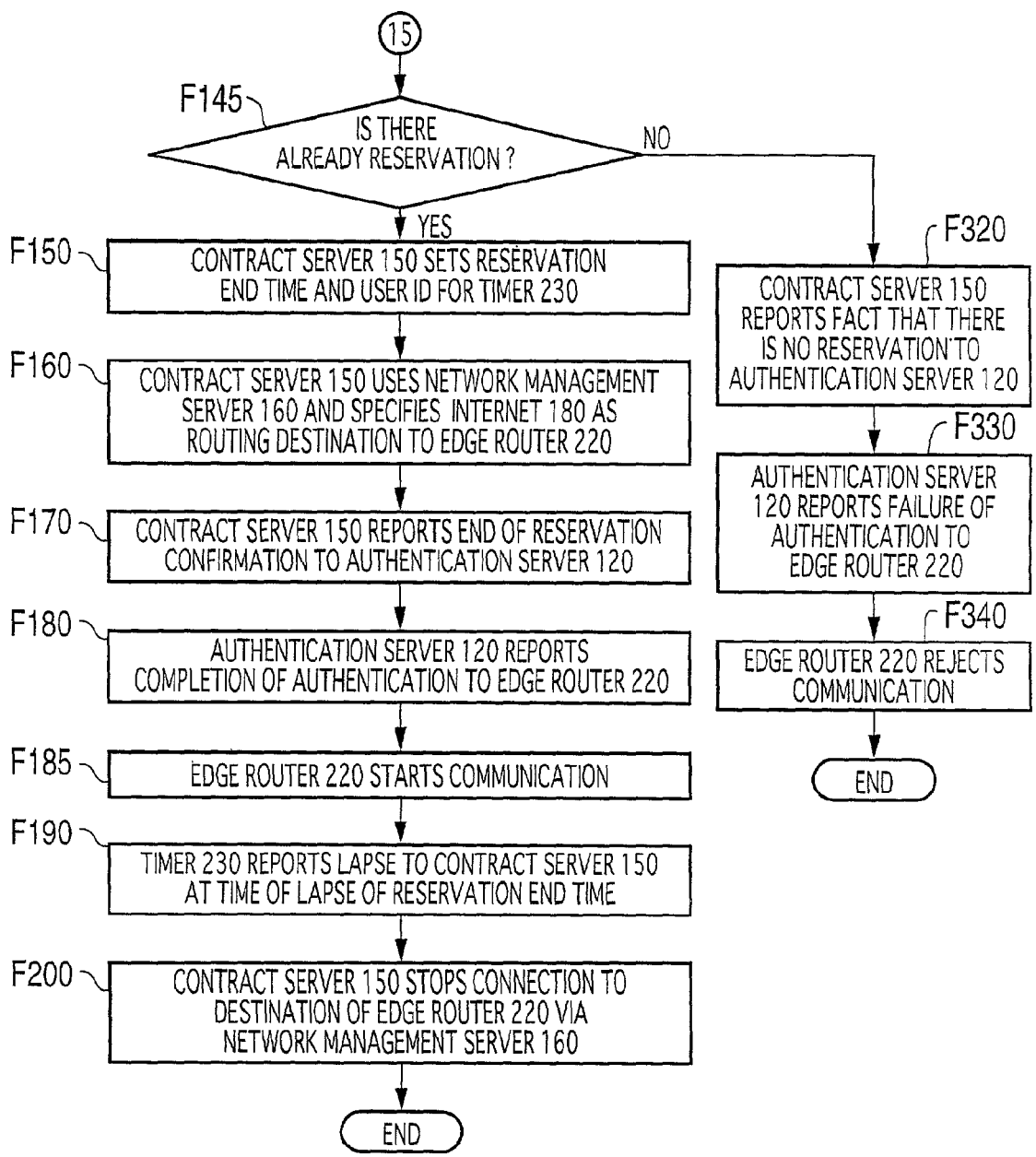
FIG. 23 is another part of the flowchart showing a connection process among operations of the system for providing an online time period reserving service, according to the second embodiment.

With reference to FIGS. 22, 23, the user gets access to the edge router 220 through the communicator 240 from the Web client 100, and sends a user ID and a password (Step F100).

The edge router 220 requests the authentication server 120 to confirm whether or not the user ID and the password are normal (Step F110).

The authentication server 120 encrypts the password. On the other hand, it obtains a password encrypted from the authentication database 130 with the user ID as a key. Then, it compares an element in which the password given by the user is encrypted, with the encrypted password in the authentication database 130. If they coincide with each other, this coincidence implies that the authentication is successful, and if they do not coincide with each other, this inconsistency implies that the authentication is unsuccessful (Step F120).

The processes on and after a step F130 are executed in the case of the successful authentication, and the processes on and after the step F300 are executed in the case of the unsuccessful authentication (Step F125).

In the case of the unsuccessful authentication, the authentication server 120 reports the failure of the authentication to the edge router 220 (Step F300). The edge router 220 rejects the communication with the Web client 100 (Step A310). The process is ended.

In the case of the successful authentication, the authentication server 120 inquires of the contract server 150 about a reservation state of a time period carried out by the user (Step F130).

The contract server 150 investigates a reservation state of a time period containing a current time of the reservation table 140 with the user ID as the key, and then judges whether or not this user reserves the time period containing the current time (Step F140).

If there is already a reservation, the operational flow proceeds to a step F150, and if there is no reservation, the operational flow proceeds to a step F320 (Step F145).

If there is no reservation, the contract server 150 reports the absence of the reservation to the authentication server 120 (Step F320).

The authentication server 120 reports the failure of the authentication to the edge router 220 (Step F330). The edge router 220 rejects the communication with the user (Step F340). Then, the process is ended.

On the other hand, if there is already a reservation, the contract server 150 sets a reservation end time and a user ID for the timer 230 (Step F150).

Next, the contract server 150 uses the network management server 160, and specifies the Internet 180 as a routing destination to the edge router 220 (Step F160).

In succession, the contract server 150 reports the end of the reservation confirmation to the authentication server 120 (Step F170).

The authentication server 120 reports the completion of the authentication to the edge router 220 (Step F180).

The edge router 220 starts the communication (Step F185). That is, the edge router 220 routes the communication data of the user through the router 170 to the Internet 180. Since the edge router 220 sends the communication data of the user to the Internet 180, the user can be connected to the Internet 180.

The timer 230 sends the report including the user ID to the contract server 150 after the lapse of the reservation end time set by the contract server 150 (Step F190).

The contract server 150 uses the network management server 160, and commands the edge router 220 to stop routing to the Internet 180 (Step F200). Thus, the user can not get access to the Internet 180.

(3) Third Embodiment

Figure 24:
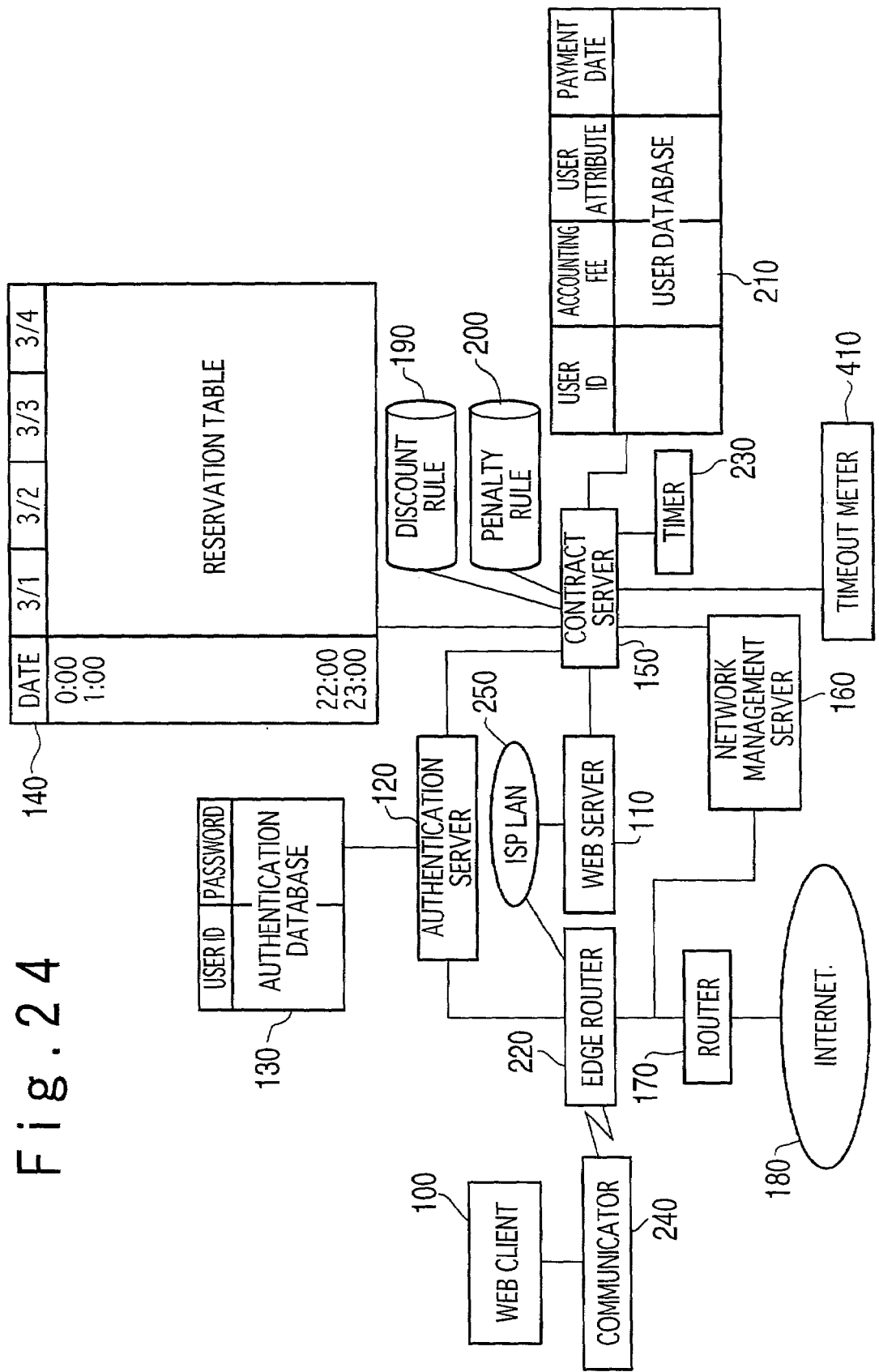
FIG. 24 is a block diagram showing a configuration of a system for providing an online time period reserving service, according to a third embodiment of the present invention.

With reference to FIG. 24, a system for providing an online time period reserving service according to a third embodiment of the present invention is designed such that a timeout meter 410 is added so as to be connected to the contract server 150, in the system for providing an online time period reserving service according to the first embodiment shown in FIG. 2. By the way, the other members are configured perfectly similarly to those of the system for providing an online time period reserving service according to the first embodiment. So, the same symbols are given to the corresponding parts, and their detailed explanations are omitted.

In a case of a lapse of a timeout period set by the contract server 150, the timeout meter 410 reports the fact of the lapse to the contract server 150. Thus, the contract server 150 can stop the process if the user does not continue the process.

The operations of the system for providing an online time period reserving service according to the third embodiment having the above-mentioned configuration will be described below in detail with reference to the drawings.

At first, a service menu process of the system for providing an online time period reserving service according to the third embodiment is described with reference to a flowchart shown in FIGS. 25, 26.

The processes from the steps B100 to B150 are equal to those of the case of the system for providing an online time period reserving service according to the first embodiment. Thus, their explanations are omitted.

The contract server 150, after the completion of the authentication of the user ID and the password (Step B150), sets a timeout period for the timeout meter 410 (Step G150).

The processes from the steps B160 to B230 are similar to those of the case of the system for providing an online time period reserving service according to the first embodiment. Thus, their explanations are omitted.

After the end of the charging process B210, the reporting process B220 or the reserving process B230, the contract server 150 releases the timeout period of the timeout meter 410 (Step G250). Then, the operational flow returns back to the step G150.

Figure 27:
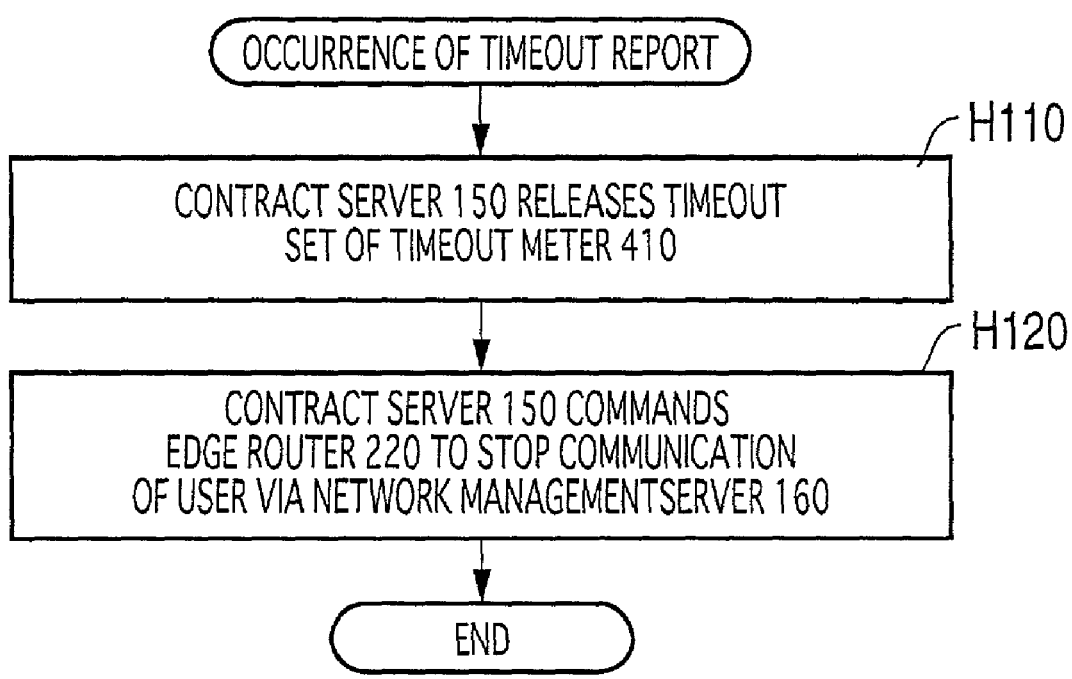
FIG. 27 is a flowchart showing a timeout process among the operations of the system for providing an online time period reserving service, according to the third embodiment.

FIG. 27 is a flowchart showing a process when the timeout meter 410 reports the fact of the lapse of the set timeout period.

In a case of an occurrence of the timeout report, the contract server 150 releases the timeout set of the timeout meter 410 (Step H110).

Next, the contract server 150 uses the network management server 160, and commands the edge router 220 to stop the communication of the user (Step H120). Then, the process is ended.

(4) Fourth Embodiment

Figure 28:
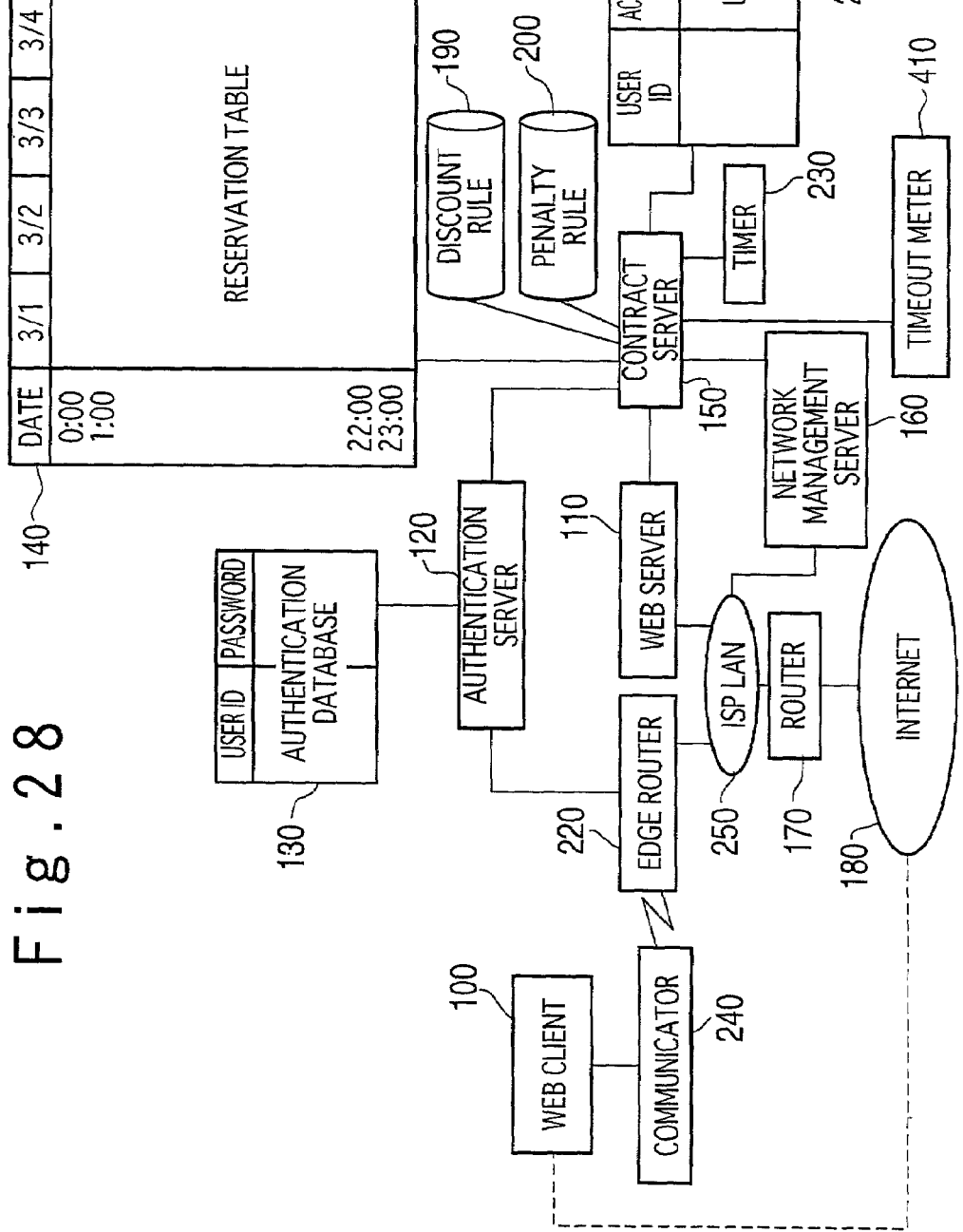
FIG. 28 is a block diagram showing a configuration of a system for providing an online time period reserving service, according to a fourth embodiment of the present invention.

With reference to FIG. 28, a system for providing an online time period reserving service according to a fourth embodiment of the present invention is designed such that a timeout meter 410 is added so as to be connected to the contract server 150, in the system for providing an online time period reserving service according to the second embodiment shown in FIG. 21. By the way, the other members are configured perfectly similarly to those of the system for providing an online time period reserving service according to the second embodiment. So, the same symbols are given to the corresponding parts, and their detailed explanations are omitted.

In a case of a lapse of a timeout period set by the contract server 150, the timeout meter 410 reports the fact of the lapse to the contract server 150. Thus, the contract server 150 can stop the process if the user does not continue the process.

Figure 5:
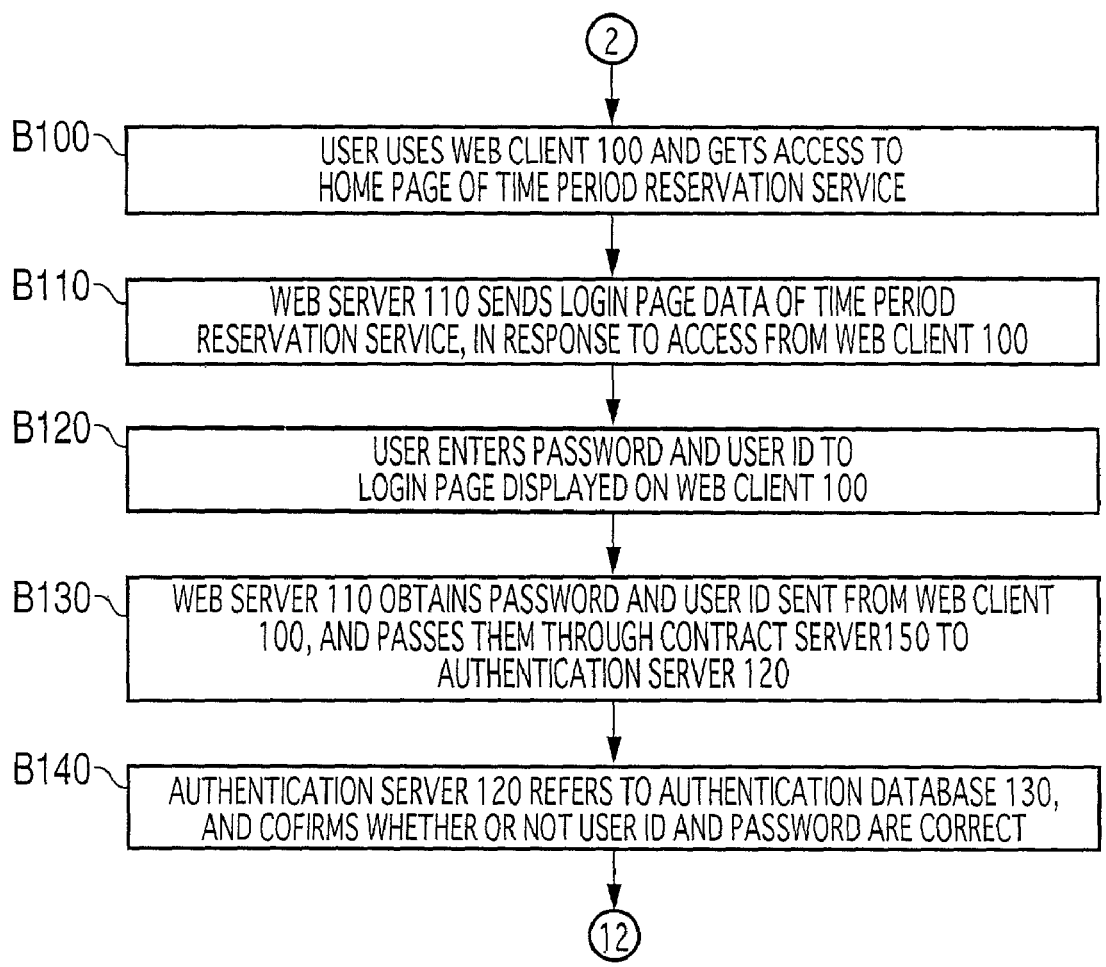
FIG. 5 is a part of a flowchart showing a service menu process among the operations of the system for providing an online time period reserving service, according to the first embodiment.
Figure 6:
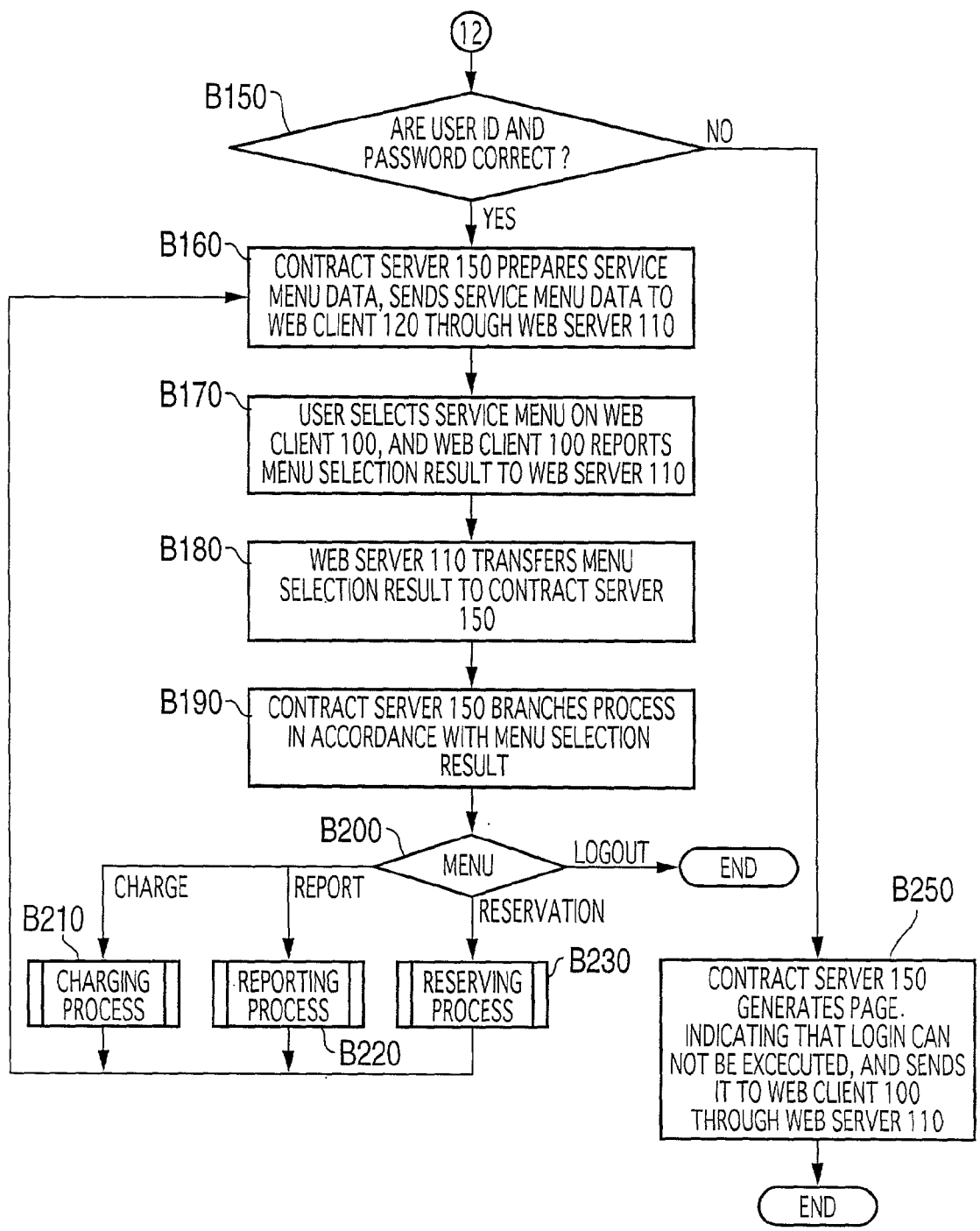
FIG. 6 is another part of the flowchart showing a service menu process among the operations of the system for providing an online time period reserving service, according to the first embodiment.
Figure 7:
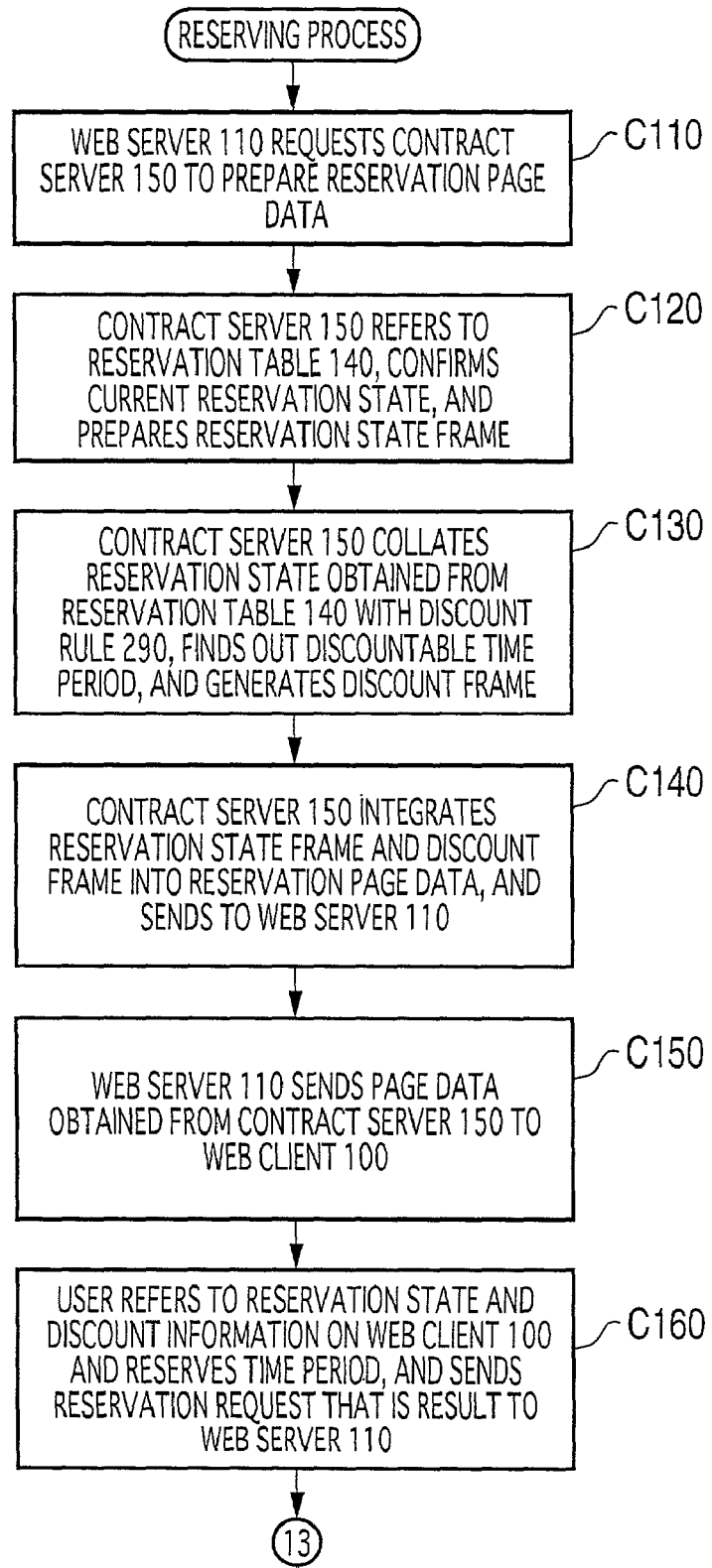
FIG. 7 is a part of a flowchart showing a former part of a reserving process among the operations of the system for providing an online time period reserving service, according to the first embodiment.
Figure 8:
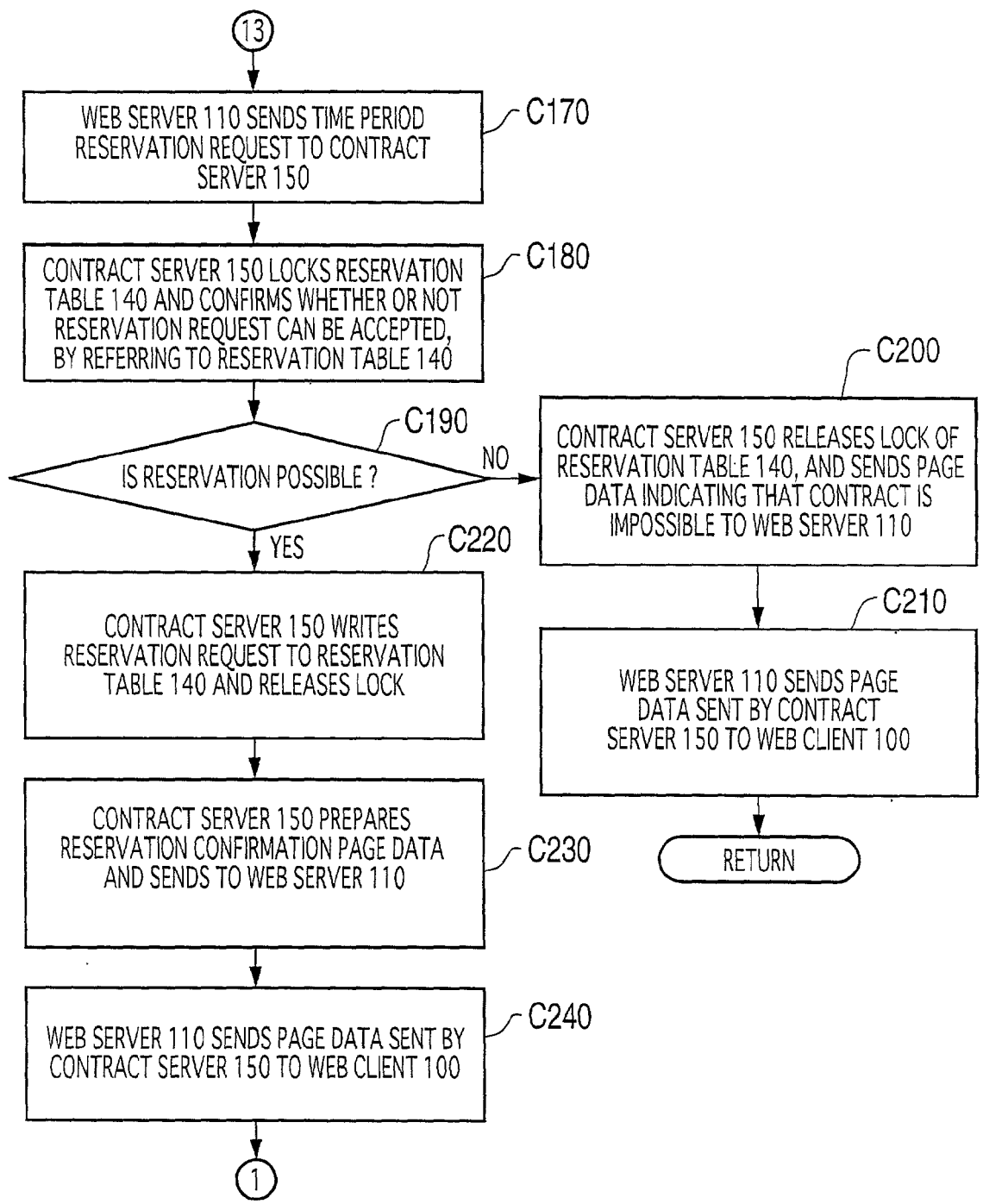
FIG. 8 is another part of the flowchart showing a former part of a reserving process among the operations of the system for providing an online time period reserving service, according to the first embodiment.
Figure 9:
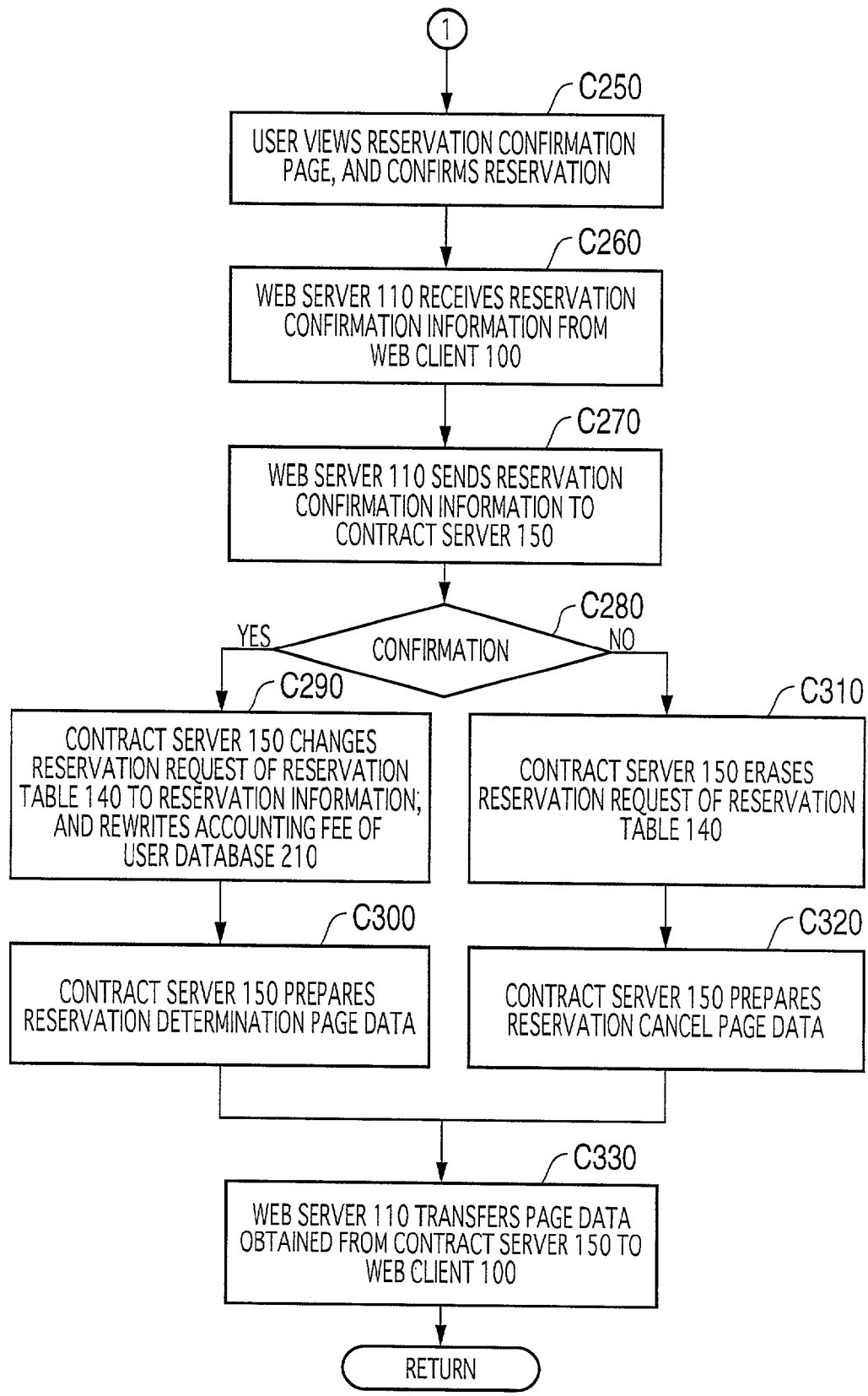
FIG. 9 is a flowchart showing a latter part of the reserving process among the operations of the system for providing an online time period reserving service, according to the first embodiment.
Figure 25:
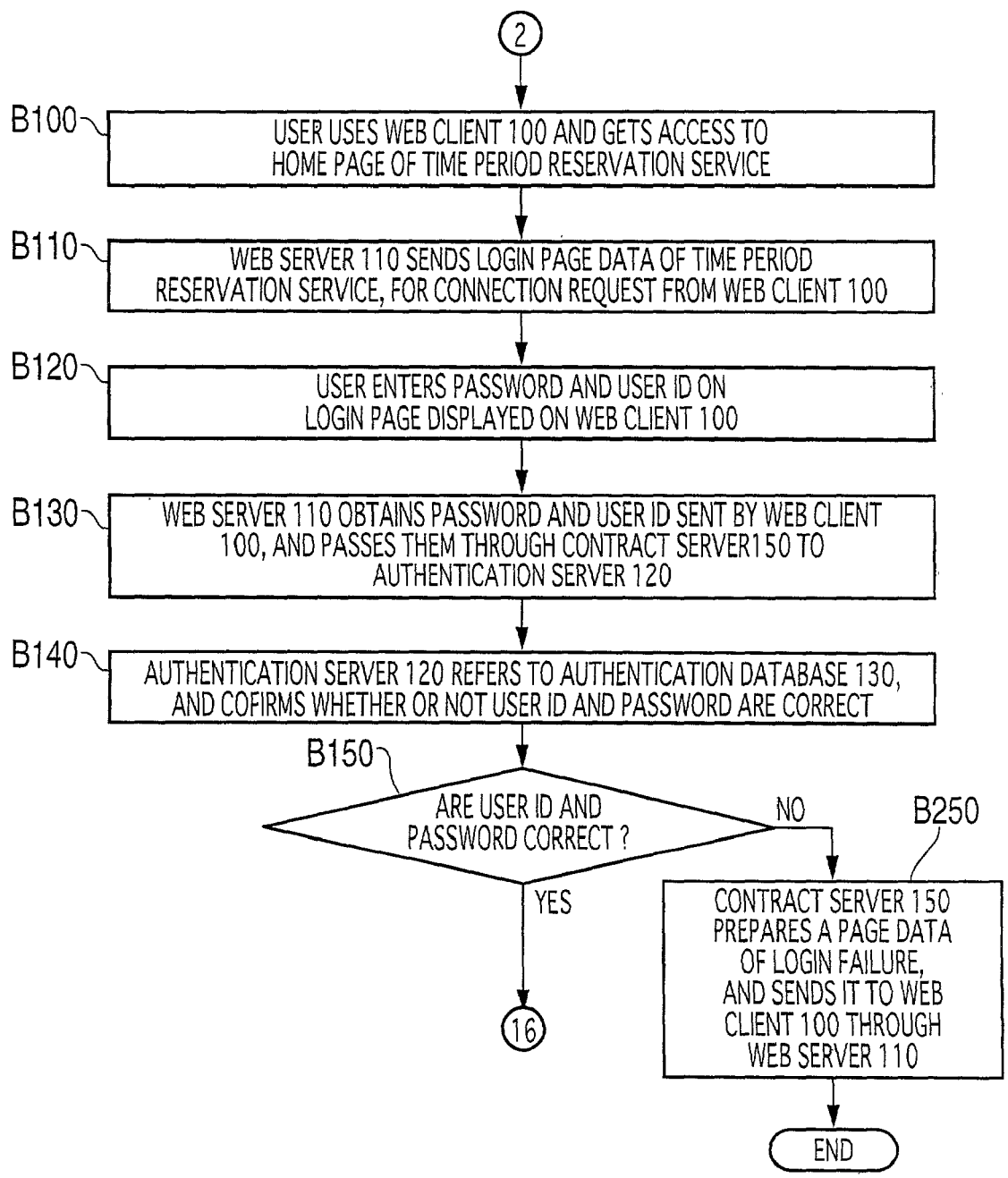
FIG. 25 is a part of a flowchart showing a service menu process among operations of the system for providing an online time period reserving service, according to the third embodiment.
Figure 26:
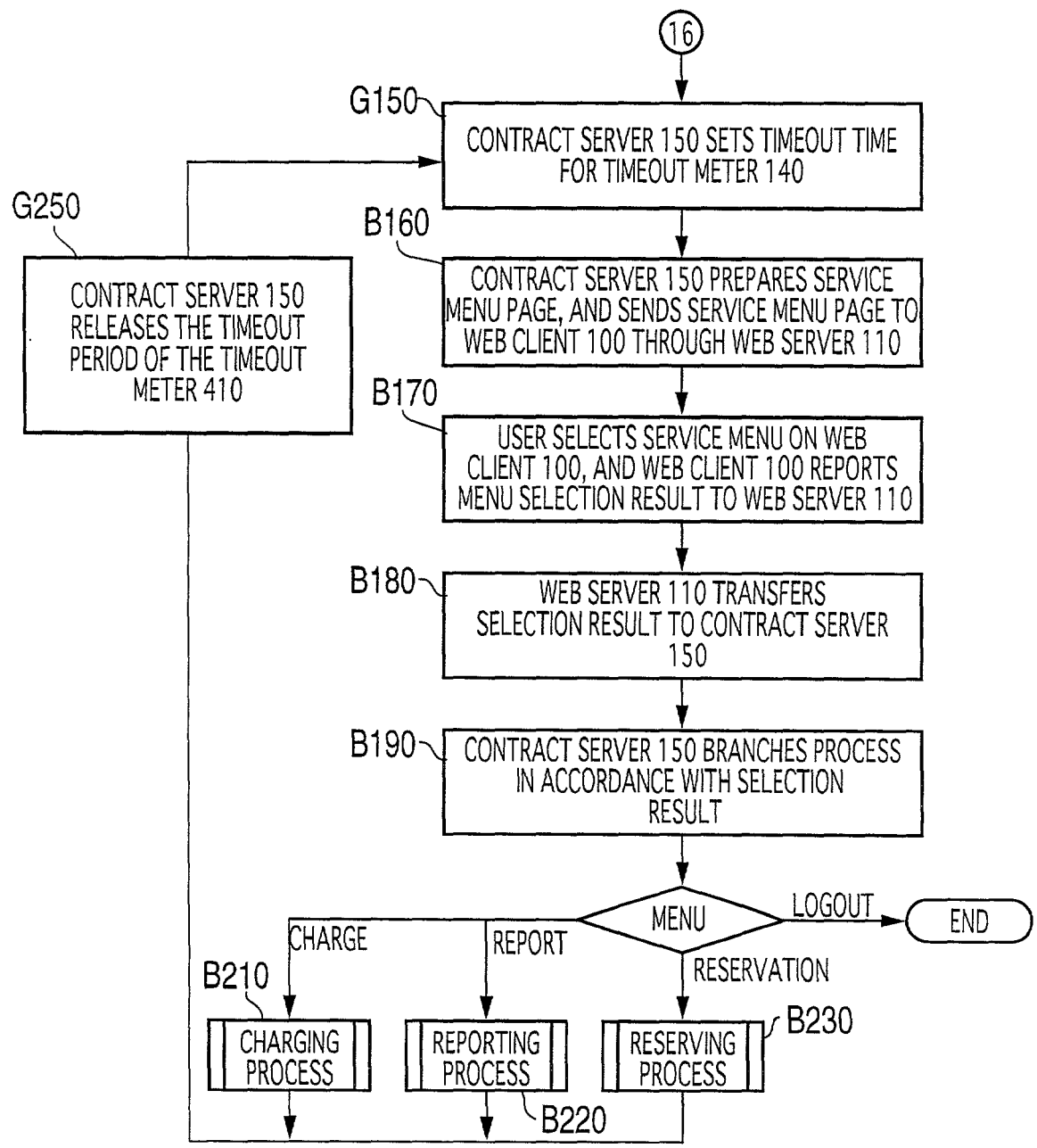
FIG. 26 is another part of a flowchart showing a service menu process among operations of the system for providing an online time period reserving service, according to the third embodiment.

The operations of the system for providing an online time period reserving service according to the fourth embodiment having the above-mentioned configuration are designed such that the flowchart of FIGS. 5, 6 showing the service menu process of the system for providing an online time period reserving service according to the second embodiment is substituted for the flowchart of FIGS. 25, 26 in the system for providing an online time period reserving service according to the third embodiment, and the flowchart of FIG. 27 showing the timeout process is further added. So, each of them carries out the operations similar to those of the system for providing an online time period reserving service according to the third embodiment. Thus, the detailed explanation is omitted.

(5) Fifth Embodiment

Figure 29:
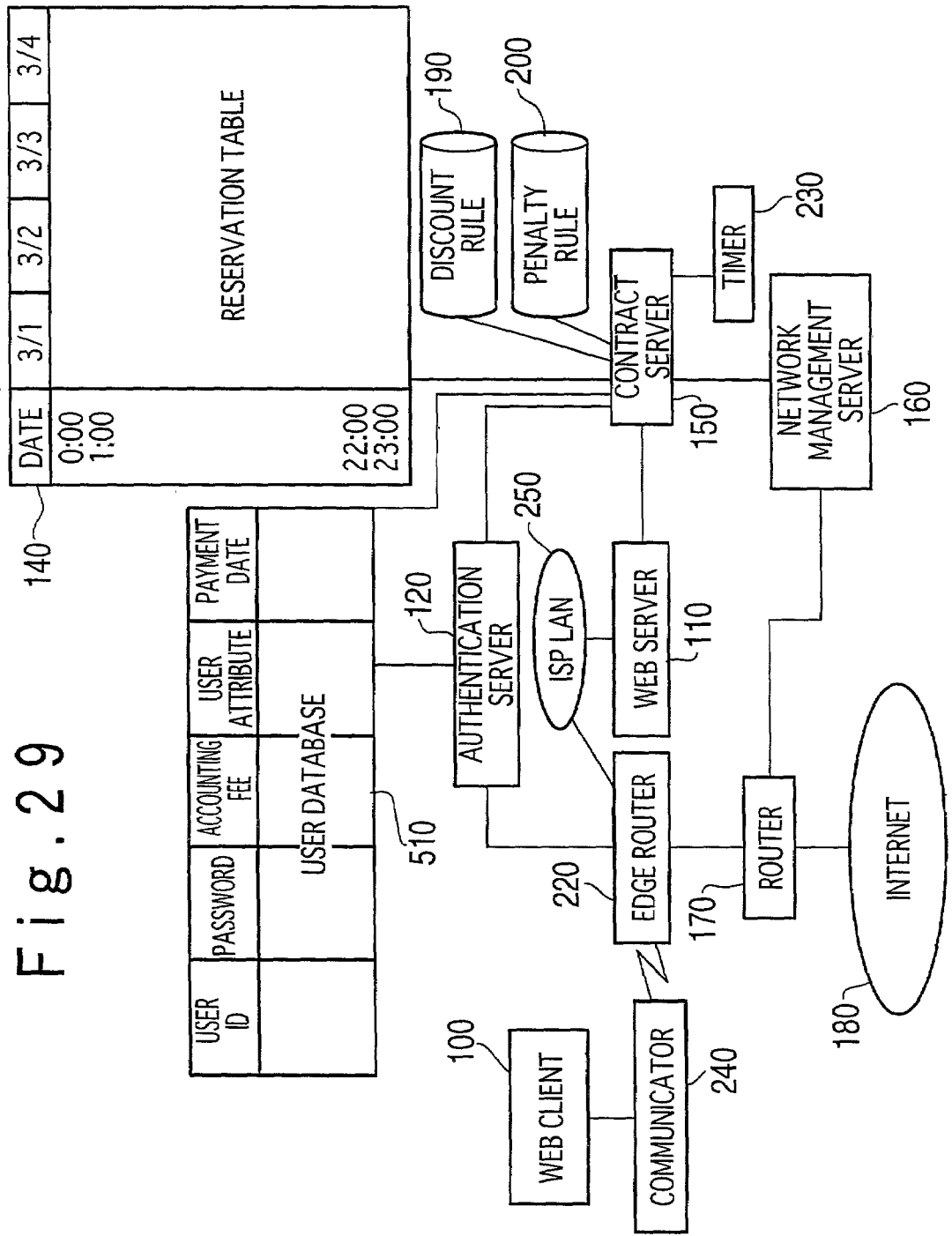
FIG. 29 is a block diagram showing a configuration of a system for providing an online time period reserving service, according to a fifth embodiment of the present invention.
Figure 30:
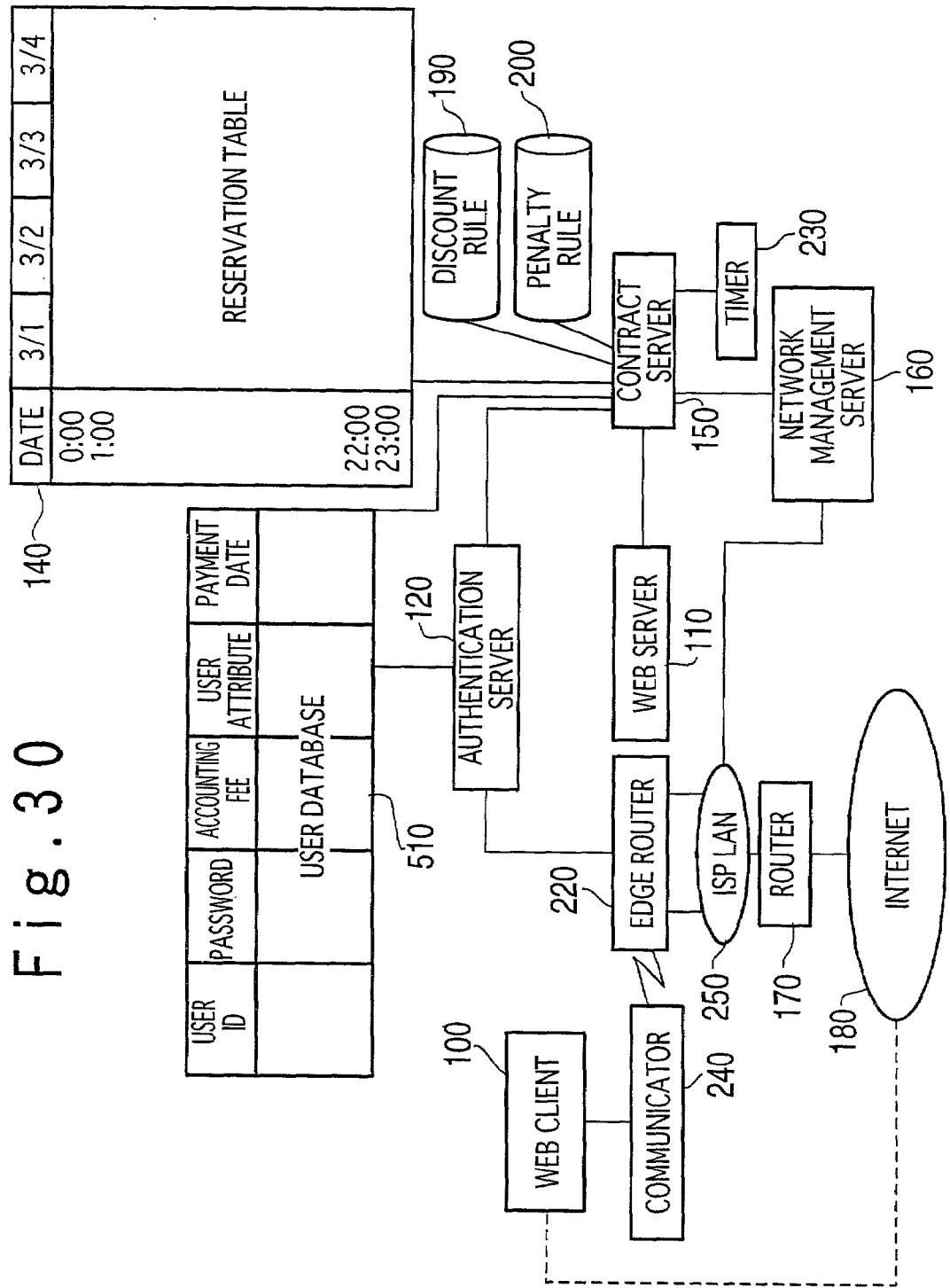
FIG. 30 is a block diagram showing a configuration of a system for providing an online time period reserving service, according to a sixth embodiment of the present invention.
Figure 31:
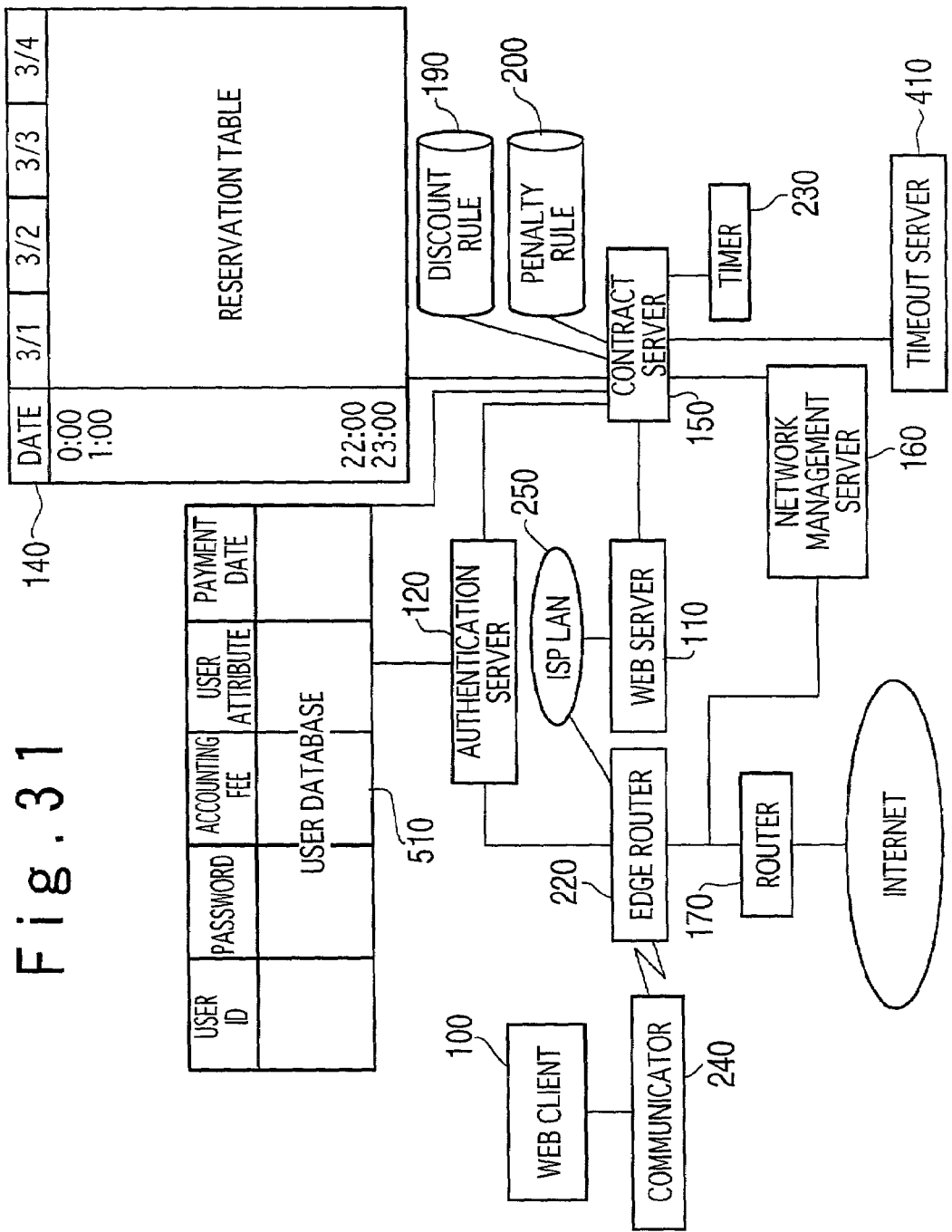
FIG. 31 is a block diagram showing a configuration of a system for providing an online time period reserving service, according to a seventh embodiment of the present invention.

With reference to FIG. 29, a system for providing an online time period reserving service according to a fifth embodiment of the present invention is designed such that a user database 510 into which the authentication database 130 and the user database 210 are integrated is installed instead of the authentication database 130 and the user database 210 in the system for providing an online time period reserving service according to the first embodiment shown in FIG. 2. By the way, the other members are configured perfectly similarly to those of the system for providing an online time period reserving service according to the first embodiment. So, the same symbols are given to the corresponding parts. Thus, their detailed explanations are omitted.

The user database 510 can obtain a password encrypted from a user ID, obtain an accounting fee from the user ID, obtain a user attribute from the user ID and obtain a payment date of a user from the user ID.

The authentication server 120 can refer to the user database 510 to thereby carry out an authentication, similarly to the first embodiment.

The contract server 150 can refer to the user database 510 to thereby carry out an accounting fee of a user, similarly to the first embodiment.

The operations of the system for providing an online time period reserving service according to the fifth embodiment having the above-mentioned configuration are similar to those of the cases shown in the flowcharts of FIGS. 3 to 12 in the system for providing an online time period reserving service according to the first embodiment. Thus, their detailed explanations are omitted.

(6) Sixth Embodiment

With reference to FIG. 28, a system for providing an online time period reserving service according to a sixth embodiment of the present invention is designed such that a user database 510 into which the authentication database 130 and the user database 210 are integrated is installed instead of the authentication database 130 and the user database 210 in the second embodiment shown in FIG. 21. The user database 510 is similar to that of the fifth embodiment. So, its detailed explanation is omitted. By the way, the other members are configured perfectly similarly to those of the system for providing an online time period reserving service according to the second embodiment. So, the same symbols are given to the corresponding parts. Thus, their detailed explanations are omitted.

The operations of the system for providing an online time period reserving service according to the sixth embodiment having the above-mentioned configuration are similar to those of the system for providing an online time period reserving service according to the second embodiment. Thus, their detailed explanations are omitted.

(7) Seventh Embodiment

With reference to FIG. 29, a system for providing an online time period reserving service according to a seventh embodiment of the present invention is designed such that a user database 510 into which the authentication database 130 and the user database 210 are integrated is installed instead of the authentication database 130 and the user database 210 of the system for providing an online time period reserving service according to the third embodiment shown in FIG. 28. The user database 510 is similar to that of the system for providing an online time period reserving service according to the third embodiment. So, its detailed explanation is omitted. By the way, the other members are configured perfectly similarly to those of the system for providing an online time period reserving service according to the third embodiment. So, the same symbols are given to the corresponding parts. Thus, their detailed explanations are omitted.

The operations of the system for providing an online time period reserving service according to the seventh embodiment having the above-mentioned configuration are similar to those of the system for providing an online time period reserving service according to the third embodiment. Thus, their detailed explanations are omitted.

(8) Eighth Embodiment

With reference to FIG. 32, a system for providing an online time period reserving service according to an eighth embodiment of the present invention is designed such that a user database 510 into which the authentication database 130 and the user database 210 are integrated is installed instead of the authentication database 130 and the user database 210 of the system for providing an online time period reserving service according to the fourth embodiment shown in FIG. 28. The user database 510 is similar to that of the system for providing an online time period reserving service according to the fourth embodiment. So, its detailed explanation is omitted. By the way, the other members are configured perfectly similarly to those of the system for providing an online time period reserving service according to the fourth embodiment. So, the same symbols are given to the corresponding parts. Thus, their detailed explanations are omitted.

The operations of the system for providing an online time period reserving service according to the eighth embodiment having the above-mentioned configuration are similar to those of the system for providing an online time period reserving service according to the fourth embodiment. Thus, their detailed explanations are omitted.

As mentioned above, the present invention can provide the following effects.

As the first effect, the Internet connection dealer can provide the service having the stable quality to the user.

This is because it is possible to protect many users from getting accesses at the same time since the maximum number of users to be connected to the Internet is managed for each time period in accordance with the reservation table.

As the second effect, the Internet connection dealer can smooth the demands from the users to thereby attain the effective usage of the communication resources.

This reason is as follows. That is, the communication usage state can be expected from the reservation table. So, a cost of a time period in which a communication demand is small is dropped to then provide to the user. Thus, it is possible to introduce the user to the empty communication time period.

The first feature of a system for providing an online time period reserving service according to the present invention lies in the configuration that a contract server (150 of FIG. 2) for exchanging an information of a reservation table of a user in order to enable a reservation of a connection service as well as a registration, a user database (210 of FIG. 2) for managing an accounting information of a user and the like, and a reservation table (140 of FIG. 2) for storing a reservation state of a time period are installed in a portion of an application on an online in a portion where a user makes an application to an Internet connection dealer. The user preliminarily reserves a time period. In the system for providing an online time period reserving service, the preliminary reservation of a time period to a user for each time can protect a transient occurrence of a huge communication amount and thereby prevent an occurrence of a congestion. Thus, this is useful for a provision of a stable communication. The Internet connection dealer can specify an empty time period by referring to the reservation table (140 of FIG. 2) and also provide a discount information to the user. Hence, it is possible to introduce the user to the empty time period.

The second feature of the system for providing an online time period reserving service according to the present invention lies in the configuration that in an ISP (Internet Service Provider) LAN (Local Area Network) (250 of FIG. 21) portion connected to an edge router (220 of FIG. 21) and a Web server (110 of FIG. 21), the ISP LAN (250 of FIG. 21) is connected through a router (170 of FIG. 21) to an Internet (180 of FIG. 21). So, the Web server (110 of FIG. 21) can be accessed from the Internet (180 of FIG. 21). Thus, this provides the convenience that the user can use a time period reservation service without any intervention of an edge router (220 of FIG. 21) in a case of a state connectable to the Internet (180 of FIG. 21).

Moreover, the third feature of the system for providing an online time period reserving service according to the present invention lies in the configuration that a timeout meter (410 of FIG. 24) is mounted in a portion of a contract server (150 of FIG. 24) in the system for providing an online time period reserving service having the first or second feature. Thus, the process of the system can be stopped if the user stops the reservation process or the like in the course of the process. Hence, this can provide a merit that a transaction with the user can be normally ended even if the user stops the reservation process.

Furthermore, the fourth feature of the system for providing an online time period reserving service according to the present invention lies in the configuration that a user database (510 of FIG. 29) having both functions of searching for an encryption password and searching for a user information are installed in the portions of an authentication database (130 of FIG. 2) and the user database (210 of FIG. 2) in the system for providing an online time period reserving service having the first, second or third feature, instead of both the databases. The combination of the user database and the authentication database can reduce the data of the user database and the authentication database. Thus, this can provide an effect of reducing a necessary memory capacity of the system.

What is claimed is:

1. A Internet access management system comprising:
   a reservation table in which a state with regard to a reservation for a connecting service to the Internet at a time period is stored;
   authentication server for receiving a first authentication including a user identification and password from a network communicator via an edge router and iuding whether or not an entry in coincidence with said user identification and password exists within an authentication database, if there is a match, said authentication server sends a first authentication signal to said edge router, and if there is no match, said authentication server sends signal to said edge router instructing said edge router to not allow access to either an Internet or ISP LAN;
   a contract unit having a network management system, said contract unit receiving an Internet access request for a current time period from a user, if said authentication server sends the first authentication signal, said contract units judges whether said user reserved the current time period, by a prior reservation request stored in said reservation table,
   wherein if said contract unit judges that no prior reservation request had been made, the contract unit automatically directs said network management system to reroute the user to an ISP LAN by issuing commands to edge router that limit user access to said ISP LAN only, such that a reservation request can be made by the user via a web server on said ISP LAN, said reservation request is made by issuing a second authentication, and if said second authentication is successful, the user has access to reservation services, said user issues a reservation request for the current time period, upon receipt of the reservation request, said contract unit locks said reservation table preventing any other access to said reservation table, said contract unit permits said reservation request when the number of users connecting to the internet at a same time as said time period included in said reservation request is smaller than or equal to a predetermined value, once said reservation request has been accepted, the user issue a second Internet access request;
   wherein if said contrast unit judges that a prior reservation request had been made, contract unit directs said network management system to route the user to the Internet, sets a timer equal to the reservation time, and when said timer elapse, the contract unit directs said network management system to command the edge router to stop routing the user to the Internet and reroute the user to the ISP LAN to make another reservation.

2. The system of reserving a connecting service to the internet at a time period according to claim 1, further comprising:
   a discount data storing unit storing a discount data to determine an accounting fee for said connecting service for a time period, and
   wherein said contract unit finds out a discountable time period with respect to said accounting fee of said connecting service with reference to said reservation table and said discount data to give a user a discount frame data showing said discountable time period and said accounting fee of said discountable time period.

3. The system of reserving a connecting service to the internet at a time period according to claim 2, wherein said accounting fee is determined based upon a utilization level of a time period for said reservation, as said discount data.

4. The system of reserving a connecting service to the internet at a time period according to claim 2, wherein said accounting fee is determined based on a condition of a day of a time period at which said user wants said connecting service to the internet, of the week, as said discount data.

5. The system of reserving a connecting service to the internet at a time period according to claim 2, wherein said accounting fee is determined based on a remaining period before a starting time of a time period at which said user wants said connecting service to the internet, as said discount data.

6. The system of reserving a connecting service to the internet at a time period according to claim 5, wherein said accounting fee is determined such that a discount rate of said accounting fee is defined as being higher, the shorter the remaining period and the smaller the number of said reservations.

7. The system of reserving a connecting service to the internet at a time period according to claim 1, further comprising:
a penalty data storing unit storing a penalty data to determine a penalty if said user cancels said reservations, and
wherein said contract unit gives said user a penalty information showing said penalty based on said penalty data.

8. The system of reserving a connecting service to the internet at a time period according to claim 7, wherein said penalty is determined based on a remaining period until a starting time of a time period, included in said permitted reserving demand, at which said user wants said connecting service to the internet, as said penalty data.

9. A network management method of comprising:
receiving an Internet access request from a user for a current time period;
authenticating said user based upon a user identification and password;
investigating a reservation state of the current time period from a reservation table, only if said authenticating is successful;
judging whether said current time period has been reserved based upon said investigation;
determining if a reservation corresponds to said user by matching an user ID corresponding with said user with a identification key on said reservation table; and
if said reservation does not match the user
rerouting the user by issuing commands to an edge router that limit user access to said ISP LAN only, such that a reservation request can be made by the user via a web server on said ISP LAN;
issuing a second authentication, and if said second authentication is successful, granting access to reservation services;
issuing a reservation request for the current time period;
locking said reservation services to others to vrevent others from issuing a different reservation request; and
determining whether said reservation request is permitted; said reservation request is permitted when the number of users connecting to the internet at a same time as said time period including said reservation request is smaller than or equal to a predetermined value;
if there is a match,
commanding a network management system to route the user to the Internet;
setting a timer equal to a reservation time,
commanding an edge router to stop routing the user to the Internet when said timer elapse, and
rerouting the user to the ISP LAN to make another reservation when said timer elapse.

10. The method of reserving a connecting service to the internet at a time period according 9, further comprising:
storing a discount data to determine an accounting fee for said connecting service for a time period;
finding out a discountable time period with respect to said accounting fee of said connecting service based on said reservation data and said discount data; and
giving a user a discount frame data showing said discountable time period and said accounting fee of said discountable time period.

11. The method of reserving a connecting service to the internet at a time period according to claim 10, wherein said accounting fee is determined based on said state of said reservation, as said discount data.

12. The method of reserving a connecting service to the internet at a time period according to claim 10, wherein said accounting fee is determined based on a condition of a day of a time period at which said user wants said connecting service to the internet, of the week, as said discount data.

13. The method of reserving a connecting service to the internet at a time period according to claim 10, wherein said accounting fee is determined based on a remaining period until a starting time of a time period at which said user wants said connecting service to the internet, as said discount data.

14. The method of reserving a connecting service to the internet at a time period according to claim 13, wherein said accounting fee is determined such that a discount rate of said accounting fee is defined as being higher, the shorter the remaining period and the smaller the number of said reservations.

15. The method of reserving a connecting service to the internet at a time period according to claim 9, further comprising:
storing a penalty data to determine a penalty if said user cancels said reservations; and
giving said user a penalty information showing said penalty based on said penalty data.

16. The method of reserving a connecting service to the internet at a time period according to claim 15, wherein said penalty is determined based on a remaining period until a starting time of a time period, included in said permitted reserving demand, at which said user wants said connecting service to the internet, as said penalty data.

17. A contract server used in an Internet management system comprising:
a judging unit having a network management system, said judging unit for receiving an Internet access request for a current time period from a user and judging whether said user reserved the current time period, by a prior reservation request, stored in a reservation table, wherein if the judging unit judges that no prior reservation request had been made, the judging unit automatically reroutes-the user by issuing commands to an edge router that limit user access to said ISP LAN only, such that a reservation request can be made by the user via a web server on said ISP LAN-said reservation request is made by issuing a second authentication, and if said second authentication is successful, the user has access to reservation services, said user issues a reservation request for the current time period, upon receipt of the reservation request, said judging unit locks said reservation table preventing any other access to said reservation table, said judging unit permits said reservation request when the number of users connecting to the internet at a same time as said time period included in said reservation request is smaller than or equal to a predetermined value, once said reservation request has been accepted, the user issue a second Internet access request;
wherein if the judging unit judges that a prior reservation request had been made, judging unit directs said network management system to route the user to the Internet, sets a timer equal to the reservation time, and when said timer elapse, the judging unit directs said network management system to command the edge router to stop routing the user to the Internet and reroute the user to the ISP LAN to make another reservation; and an input unit inputting the reservation request to reserve a connecting service to the internet at a certain time period from the user.

* * * * *